US007184530B2

(12) United States Patent
Warrier et al.

(10) Patent No.: US 7,184,530 B2
(45) Date of Patent: Feb. 27, 2007

(54) PREPAID BILLING SUPPORT FOR SIMULTANEOUS COMMUNICATION SESSIONS IN DATA NETWORKS

(75) Inventors: Chandra Warrier, Schaumburg, IL (US); Chenwei Yan, Hoffman Estates, IL (US)

(73) Assignee: UTStarcom, Inc., Alamdea, CA (US)

( * ) Notice: Subject to any disclaimer, the term of this patent is extended or adjusted under 35 U.S.C. 154(b) by 404 days.

(21) Appl. No.: 10/321,870

(22) Filed: Dec. 17, 2002

(65) Prior Publication Data

US 2004/0017905 A1 Jan. 29, 2004

Related U.S. Application Data

(60) Provisional application No. 60/398,881, filed on Jul. 25, 2002, provisional application No. 60/398,877, filed on Jul. 25, 2002, provisional application No. 60/398,859, filed on Jul. 25, 2002.

(51) Int. Cl.
*H04M 15/00* (2006.01)

(52) U.S. Cl. .......................... 379/114.15; 379/114.17; 379/114.2; 379/144.01; 455/405

(58) Field of Classification Search ........... 379/114.01, 379/114.15, 114.17, 114.2, 114.27, 114.28, 379/115.01, 115.03, 127.02, 127.04, 127.06, 379/144, 145; 455/405, 408, 432.01, 433, 455/558, 406
See application file for complete search history.

(56) References Cited

U.S. PATENT DOCUMENTS

| 5,839,076 | A | 11/1998 | Becher |
| 5,867,788 | A | 2/1999 | Joensuu |
| 5,978,678 | A | 11/1999 | Houde et al. |
| 5,995,822 | A * | 11/1999 | Smith et al. ................ 455/406 |
| 6,058,300 | A | 5/2000 | Hanson |
| 6,070,067 | A | 5/2000 | Nguyen et al. |

(Continued)

OTHER PUBLICATIONS

3$^{rd}$ Generation Partnership Project 2 ("3GGPP2"), TSG-P, "Wireless Packet Data Networking", *"Pre-Paid Services in the cdma2000 packet data network"*, Nortel Networks, 3GPP2-P00-20020415_007, Apr. 2002, 10 pages.

(Continued)

*Primary Examiner*—Quoc Tran
(74) *Attorney, Agent, or Firm*—Fitch, Even, Tabin & Flannery

(57) ABSTRACT

A method and system for providing prepaid billing for two concurrent communication sessions is accomplished by a first-network-access device, such as a WIN SCP, receiving from a prepaid-user account prepaid services for a first-communication session. During the first-communication session, a second-network-access device, e.g., an AAA server, requests from the prepaid-user account additional prepaid services for a second-communication session that is to occur on a data network. In response to the request, the first-network-access device receives from a prepaid-billing system a status-update request. Responsive to the update request, the first-network-access device sends to the prepaid-billing system the prepaid-service usage for the first communication session. The prepaid billing system updates the prepaid user account by debiting the prepaid services usage from the prepaid-user account. If prepaid services remain after updating the prepaid user account, the second-network-access device receives from the prepaid-billing system prepaid services for the second communication session.

38 Claims, 9 Drawing Sheets

U.S. PATENT DOCUMENTS

| | | | |
|---|---|---|---|
| 6,078,805 | A | 6/2000 | Scott |
| 6,115,613 | A * | 9/2000 | Jonsson ................ 455/519 |
| 6,185,198 | B1 | 2/2001 | LaDue |
| 6,185,414 | B1 | 2/2001 | Brunner et al. |
| 6,208,851 | B1 | 3/2001 | Hanson |
| 6,226,364 | B1 | 5/2001 | O'Neil |
| 6,330,443 | B1 | 12/2001 | Kirby |
| 6,480,591 | B1 * | 11/2002 | Penfield et al. ........ 379/144.01 |
| 6,577,718 | B1 * | 6/2003 | Kalmanek et al. ..... 379/114.22 |
| 6,625,438 | B2 | 9/2003 | Hanson |
| 6,684,072 | B1 | 1/2004 | Anvekar et al. |
| 6,741,686 | B2 * | 5/2004 | Bekkevold et al. ...... 379/114.2 |
| 6,816,586 | B2 * | 11/2004 | Tuunanen ............. 379/221.08 |
| 6,829,473 | B2 * | 12/2004 | Raman et al. ............. 455/406 |

OTHER PUBLICATIONS

3$^{rd}$ Generation Partnership Project 2 ("3GGPP2"), TSG-P, "*Descriptions of Definitions of CDMA2000-AAA Radius Protocol: CDMA2000 PDSN-AAA-PREPAID Server Solution of Protocol Extension Supporting the Prepaid Feature*", Huawei/CWTS, May 2002, 30 pages.

3$^{rd}$ Generation Partnership Project 2 ("3GGPP2"), "*Prepaid Services for IS-835 Release C*", Cisco Systems, 3GPP2 P00.20020512-09, May 13-17, 2002, 14 pages.

3$^{rd}$ Generation Partnership Project 2 ("3GGPP2"), "*Packet Prepaid Service in cdma2000 Wireless IP Network*", "*Stage 1 Requirements*", 3GPP2 S.Pxxxx Version 0.2, Jun. 2002, 11 pages.

3$^{rd}$ Generation Partnership Project 2 ("3GGPP2"), "*Pre-Paid Services for IS-835 Release C*", Cisco Systems, 3GPP2 P00.20020610-24, Jun. 10-14, 2002, 14 pages.

3$^{rd}$ Generation Partnership Project 2 ("3GGPP2"), TSG-P, "*Prepaid stage 2*", Ericsson, P00-20020610-016, Jun. 2002, 6 pages.

3$^{rd}$ Generation Partnership Project 2 ("3GGPP2"), TSG-P, "*Prepaid Architecture for Packet Data Service*", Lucent Technologies, Jun. 10, 2002, 5 pages.

3$^{rd}$ Generation Partnership Project 2 ("3GGPP2"), "*Pre-Paid Services for IS-835 Release C*", Cisco Systems, 3GPP2 P20.20020708-13, Jul. 8-12, 2002, 14 pages.

3$^{rd}$ Generation Partnership Project 2 ("3GGPP2"), TSG-P, "*Stage 2 and 3 details for the Packet Data Prepaid service*", Nortel Networks, P20-20020708-xxx, Jul. 2002, 11 pages.

3$^{rd}$ Generation Partnership Project 2 ("3GGPP2"), TSG-P, "*Prepaid stage 2*", Ericsson, P20-20020708-0xxR1, Jul. 2002, 10 pages.

3$^{rd}$ Generation Partnership Project 2 ("3GGPP2"), 3GPP2 TSG-P, "*Pre-Paid Services in the cdma2000 packet data network*", Tahoe Networks, 2002yyyy-Oxx, Jul. 2002, 15 pages.

* cited by examiner

PROTOCOL STACK

PREPAID BILLING SUPPORT FOR SIMULTANEOUS COMMUNICATION SESSIONS IN DATA NETWORKS

This application hereby claims the benefit of the following three previously filed and copending provisional applications:

60/398,877 filed on Jul. 25, 2002
60/398,881 filed on Jul. 25, 2002
60/398,859 filed on Jul. 25, 2002

BACKGROUND

1. Field

The claimed invention relates to communications of computer networks. More specifically, it relates to a method and system for prepaid billing for wireless mobile services in communications networks.

2. Description of Related Art

Today a wide array of "special" or enhanced telecommunications services ("services") are available to subscribers. Telecommunications networks enable these services using "signals" or signaling messages in addition to the voice or data that compose the conversation between the calling party and the called party. These signals monitor the status of the lines, indicate the arrival of incoming calls, and carry the information needed to route the voice or other data through the network. In out-of-band signaling, these signals are carried on a separate signaling network, and are used to control the switches in the circuit-switched network for setting up, tear down, and maintaining the circuit between the calling party and called party. Currently, Signaling System 7 ("SS7") is the most commonly used signaling system.

Most telecommunications networks in the United States use the advanced intelligent network ("AIN") approach in which most of the control information and call processing logic, usually referred to as "service logic," resides in a central network location, such as a service control point ("SCP"), instead of in the multitude of switches. Further, AIN provides a set of standardized messages that may be exchanged between network elements, such as switches, and the SCP to allow for a variety of services. These standards are embodied in Bellcore's AIN Release 0.1 and AIN Release 0.2.

The call control functions in a centralized SCP simplify network management since changes made at the SCP will apply to a large number of switches. Having the call control functions in a centralized SCP also makes changing or upgrading services and adding new services much easier and reduces the problem of differences in switches from different vendors. Moreover, the centralization at the SCP and the standardized message set allows an SCP to control a large number of switches, which are referred to as service switching points ("SSPs"). Another benefit of the centralization at the SCP and the standardized message set is that the SCP may control switches manufactured by different vendors. Not only does this enable manufacturers to produce generic switches, but produce generic switches that are able to provide a wide variety of services.

In operation, the SSPs signals or queries the SCP for guidance at predefined "trigger points" in the call processing, which can occur when the SSP is attempting to originate a call or attempting to terminate a call. The query signal that passes from the SSP to the SCP may contain a set of relevant parameters, in a predefined format. Such parameters can include the calling party's telephone number and the called party's telephone number. When the SCP receives the query, it executes the appropriate service logic and consults appropriate databases to obtain the information and instructions needed to provide the intelligent network service. The SCP then sends to the SSP a response message, which may contain instructions for completing or connecting the call.

The signaling network typically includes one or more signal transfer points ("STPs") that route the signals through the signaling network between the large number of SSPs and other network interconnected elements. When SS7 signaling is used, signals may be routed to specific network elements based on their point codes. Alternatively, signals may be routed using Global Title Translation ("GTT"), in which STPs route signals to their intended destinations without the need for point codes. In particular, when GTT is used, STPs route signals based on information contained in their payloads.

Like landline telecommunication services, many of today's wireless telecommunications networks are based on a similar signaling model. In these networks, commonly referred to a first-generation (1G) and second generation (2G) networks, switching is performed by mobile switching centers (MSCs), in which each MSC typically controls one or more base nodes or base transceiver nodes (BTSs), sometimes via one or more base node controllers (BSCs). In some networks, the functions of the MSC are integral to or integrated into the BSCs, thereby eliminating the MSC and reducing the components in a wireless network. Each BTS provides a wireless coverage area within which mobile nodes can communicate with the BTS over an air interface. The mobile nodes can be cellular, PCS telephones, or other devices. Different formats may be used for communicating over this air interface. For example, some of the commonly used formats in are Advanced Mobile Phone Service (AMPS), Time Division Multiple Access (TDMA), Global System for Mobile Communications (GSM), and Code Division Multiple Access (CDMA).

Each mobile node typically has a "home" wireless network, in which a home location register (HLR) serves as a centralized repository of information about the mobile node. Typically, the HLR contains a service profile for the mobile node; the last reported location of the mobile node; and the current status of the mobile node, such as whether it is active or inactive. The service profile indicates which enhanced services the mobile node subscribes to, including whether the user subscribes to a plan containing prepaid billing services.

Mobile nodes may identify themselves to wireless networks using one or more types of identification numbers, such as (i) a 10-digit Mobile Identification Number (MIN), which may be the dialed directory number; (ii) a Mobile Directory Number (MDN), which is typically different from its MIN; (iii) a unique 32-bit Electronic Serial Number (ESN), which is generally programmed into the mobile node.

When an MSC (or alternatively a BSC) needs to find information about a mobile node, such as where it is located or what services it subscribes to, it queries the HLR corresponding to that mobile node. For example, to determine the services or the service plan that a user subscribes to, the MSC (or alternatively a BSC) queries an OLR, which may be outside of its home network, if the mobile node is roaming. The queries are then routed to the appropriate HLR based on the mobile node's identifier, such as the MIN and/or MDN. Further, the MSC (or alternatively a BSC) may reference internal translation tables to determine which HLR to query for which MINs and/or MDNs. Alternatively, STPs may route queries to the appropriate HLR using GTT and the MIN and/or MDN.

Paralleling AIN used in wireline networks, an MSC (or alternatively a BSC) may query a Wireless Intelligent Network (WIN) SCP for call processing instructions. Like the SCP in an AIN network, these call processing instructions are typically performed when originating a call from or terminating a call to the mobile node and using trigger points set by the mobile node's service profile, which the MSC (or alternatively the BSC) downloaded from the mobile node's HLR. Moreover, an MSC (or alternatively a BSC) uses such queries to obtain the call processing instructions needed to provide enhanced telecommunications services to the mobile node. In response to such queries, the WIN SCP will typically execute the appropriate service logic and consult the mobile node's service profile to formulate the call processing instructions that the WIN SCP then sends to the MSC (or alternatively a BSC).

The Telecommunications Industry Association/Electronics Industry Association (TIA/EIA) has developed a number of interim standards containing the specifications for signaling between MSCs, BSCs, HLRs, WIN SCPs, and other network elements. One of the most common standards for wireless networks in the United States is the TIA/EIA Interim Standard 41 ("IS-41") and the revisions thereof. The IS-41 signaling is typically run as an application on another signaling system, such as SS7. A recent revision of this Interim Standard, ANSI-41 Rev. D, which was published in July, 1997, is fully incorporated herein by reference. Furthermore, extensions to ANSI-41D or WIN triggers and WIN call processing are included in Interim Standard IS-771, which was published July, 1999, and is fully incorporated herein by reference.

Providing enhanced services in the manner noted above is acceptable for voice services for telecommunication networks, which employ an HLR or equivalent central repository that is accessible to the SS7 network. This is because the HLR controls authorization of voice services. Further, units of use in the voice networks are typically time-based. And since voice activity in the current telecommunication networks inherently involves the SS7 network, the draw down of the usage units is reported to the HLR on a regular basis so that usage may be monitored reasonably well.

Because the above-described wireless networks have their foundation in older circuit-switched or similar packet-switched technologies, transmission of video and data is quite slow, which limits the type of multimedia, video and data services that V can be used. In addition to the 2G networks, newer second-and-a-half generation ("2.5G") network services are currently providing communication services to mobile nodes. These 2.5G networks use newer packet-switched services, which allow for increased transmission speeds for video and data as compared to 2G networks. Like the 2G networks, current 2.5G networks have similar limitations on the types of multimedia, video, and data services that can be used.

Mobile nodes may take advantage of third generation ("3G") network services, which allow for significantly faster data rates that in turn allow for a broader range of multimedia, video and data services to be used on a roaming mobile node. The 3G networks provide services for packet-based transmission communications with the capability of providing Internet Protocol (IP) traffic, such as Mobile Internet Protocol ("Mobile IP") traffic; symmetrical and asymmetrical data rates; multimedia services such as video conferencing and streaming video; international roaming among different 3G operating environments; and more. Typical 3G systems include packet-based transmission of digitized voice, data and video. The 3G networks encompass a range of wireless technologies, which include Code Division Multiple Access ("CDMA"), Universal Mobile Telecommunications Service ("UMTS"), Wide-band CDMA ("WCDMA"), and others.

In 3G networks, communications originating and terminating from mobile nodes may use Mobile IP to establish a voice, video and/or data call from a mobile node that has roamed from its home network to a foreign network. Mobile IP allows mobile nodes to transparently move between different Internet Protocol sub-networks ("subnets"). For a mobile node to use the services of the network, it has to connect to its home subnet. The home subnet provides access to an external network, such as the Internet, through a "home agent" that serves as the subnet's gateway router.

To register on the 3G network, the mobile node may periodically transmit "agent solicitation" messages to the home agent. The mobile node also listens for "agent advertisement" messages from the home agent. When a mobile node receives an agent advertisement message indicating that it is now on it home subnet, it registers with its home agent.

To provide services to the mobile node when the mobile node "roams," (i.e., dynamically changes its physical location), the mobile node periodically transmits "agent solicitation" messages to other gateway routers, and also listens for "agent advertisement" messages from the other gateway routers. When a mobile node receives an agent advertisement message indicating that it is now on a foreign subnet, it registers with the foreign gateway router or "foreign agent," and with its home agent. The registration with the foreign agent allows the mobile node to receive data on the foreign subnet. Whereas, the concurrent registration with the home agent provides an indication to the home subnet that the mobile node is not at home. This may allow for forwarding to the foreign subnet the data directed to the mobile node received on its home subnet.

As noted above, 2G and later networks provide packet data services in addition to the current voice services. Further, migration of voice services to a Voice over IP model complicates matters because the packet data networks may and most likely will become the carrier for voice traffic, in contrast to the current circuit based mechanism, where voice traffic is controlled by SS7 and/or Wireless Intelligent Network (WIN) elements.

However, there are several problems associated with establishing voice, video or data calls on 3G networks. One problem is that users currently cannot easily buy, use or replenish prepaid services, such as pre-paid calling accounts on mobile nodes on some 3G networks. Such problems occur when adapting billing systems used by the SS7, WIN or other out-of-band signaling networks to 3G networks, or the provider of the 3G networks access will not undertake providing 3G services to high-risk users.

Without prepaid billing systems, large delays in receiving payments and/or bills can result in suspension or discontinuation of a user's 3G network services. And after fees are paid, it may be difficult for users of mobile nodes on to re-establish service, when pre-paid billing systems are not implemented. Moreover, providers may have difficulty in disconnecting active users of mobile nodes when outstanding fees are owed. This difficulty is further complicated when the active users of the mobile nodes are constantly roaming from one foreign network to another because usage on each of the foreign networks may not be reported until a later date. In such case, it is possible for a user to overuse the amount of allotted network services. Conversely, users may be overcharged for actual usage if multiple network elements charger for the same service. While the aforementioned issues are common to both the data and voice services, the growth of data services and the demand for prepaid services in global markets will result in a need to satisfy these deficiencies.

Packet-data traffic in the 3G networks is typically served to wireless mobile nodes by a Packet Data Serving Node ("PDSN"). The PDSN provides the same type of call control responsibility in the packet data network that the HLR provides in the circuit voice WINs network. Unlike the HLR, however, for the mobile nodes that it serves, packet data traffic may pass through the PDSN. Being in the packet-data-traffic path allows the PDSN to directly monitor and measure the usage of the wireless prepaid service. The PDSN need not be in the packet-data-traffic path, however, because the PDSN may receive usage information from another PDSN over a PDSN to PDSN link. Further details regarding inter-PDSN transfer are provided by co-pending U.S. application Ser. No. 10/097796, filed on Mar. 14, 2002, and titled "Method and System for Re-Direction and handoff for Pre-Paid Mobile Services in Third Generations Networks," which is fully incorporated herein by reference.

Current 3G network models presently suffer from having no mechanism for adapting prepaid billing systems used by the SS7, WIN or other out-of-band signaling networks to data networks. Thus, it is desirable to provide a method and system to support prepaid accounting and billing services that work correctly with mobile nodes on 3G networks.

SUMMARY

According to one embodiment, a method for providing prepaid billing for two concurrent communication sessions may be accomplished by a first-network-access device, such as a WIN SCP, receiving from a prepaid-user account a prepaid services for a first-communication session. Sometime during the first-communication session, a second-network-access device, such as a AAA server, may request from the prepaid-user account additional prepaid services for a second-communication session that is to occur on a data network. In response to the request, the first-network-access device receives from a prepaid-billing system a status-update request.

Responsive to the update request, the first-network-access device sends to the prepaid-billing system the prepaid-service usage for the first communication session. The prepaid billing system updates the prepaid user account by debiting the prepaid services usage from the prepaid-user account. If prepaid services remain after updating the prepaid user account, the second-network-access device receives from the prepaid-billing system prepaid services for the second communication session.

BRIEF DESCRIPTION OF THE DRAWINGS

Preferred embodiments of the invention are described below in conjunction with the appended figures, wherein like reference numerals refer to like elements in the various figures, and wherein.

DETAILED DESCRIPTION

1. Exemplary Architecture for Prepaid Billing

Figure 1:
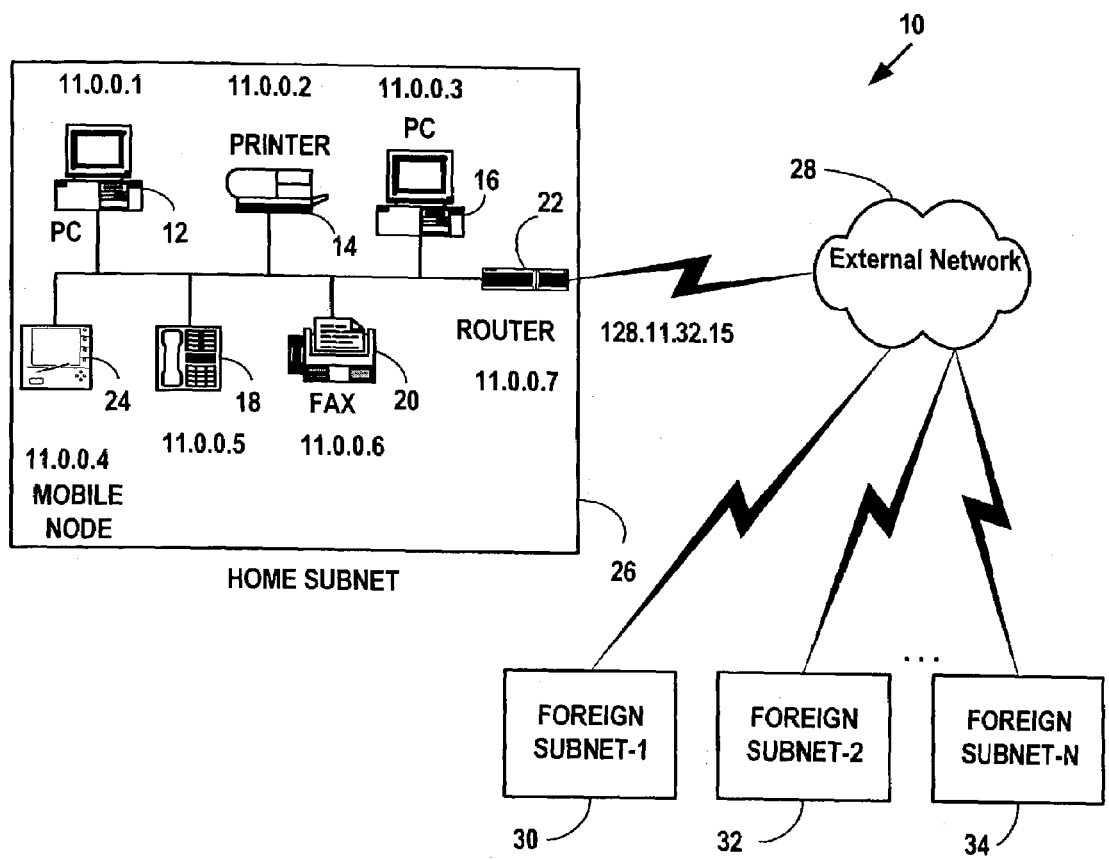
FIG. 1 is a first block diagram illustrating an exemplary network system in accordance with an exemplary embodiment.

FIG. 1 is a block diagram illustrating an exemplary network system 10 in accordance with an exemplary embodiment. The network system 10 includes one or more local network devices 12, 14, 16, 18, 20, 22, 24. More or fewer local network devices can also be used. Each of the local network devices may be assigned network addresses (e.g., 1 1.0.0.x) on a local subnet 26. The local subnet 26 includes but is not limited to, a wireless network, a wired network, a wireless or wired LAN, an optical network or a cable network. However, other computer networks can also be used.

The local subnet 26 is connected to an external network 28, such as the Internet or an intranet, via gateway/router 22. The gateway/router 22 may connect local subnet 26 to other computer networks using different networking protocols or operating at different transmission capacities. The gateway/router 22 may also translate the data of a communication session between differing network protocols, and may provide for routing data (in the form of data packets) to an appropriate network node or network device. Local network devices on the local subnet 26 can. reach one or more remote network devices on foreign subnets 30, 32, 34, via the external network 28.

Figure 3:
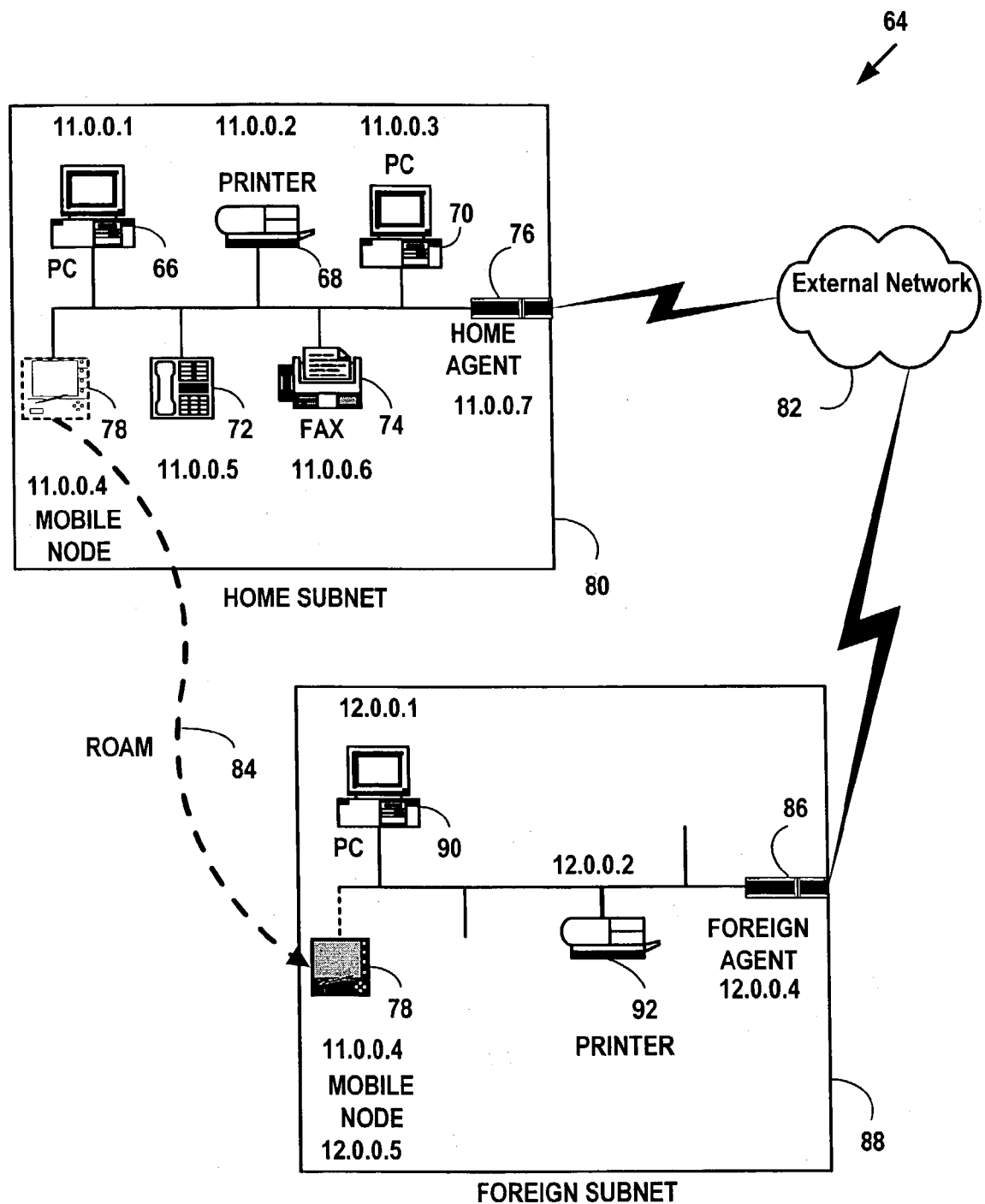
FIG. 3 is a third block diagram illustrating an exemplary Mobile IP system according to an exemplary embodiment.

Exemplary network devices include devices that can interact with network system 10, and with the exemplary mobile network system illustrated in FIG. 3. Further, these exemplary network devices can communicate with the system 10 and system illustrated in FIG. 3 according to all or selected portions of standards proposed by (i) the Data-Over-Cable-Service-Interface-Specification ("DOCSIS") standards from the Multimedia Cable Network Systems ("MCNS"), (ii) the Institute of Electrical and Electronic Engineers ("IEEE"), (iii) International Telecommunications Union-Telecommunication Standardization Sector ("ITU"), Telecommunications Industry Association ("TIA"), (iii) Internet Engineering Task Force ("IETF"), (iv) Wireless Application Protocol ("WAP") Forum, and/or (v) the Third Generation Partnership Project ("3GPP") standards. Network devices based on other standards, however, may also be used.

DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." TIA standards can be found at the URL "www.tiaonline.org." IETF standards can be found at the URL "www.ietf.org." The WAP standards can be found at the URL "www.wapforum.org." The 3GPP standards may be found at the URL "www.3gpp.org."

Each network device may contain a processing system with at least one high speed Central Processing Unit ("CPU"), data storage, and memory. Furthermore, an operating system may manage the resources of each network device. The data storage may include computer readable medium devices such as magnetic disks, optical disks, organic memory, and/or any other volatile (e.g., Random Access Memory ("RAM")) or non-volatile (e.g., Read-Only Memory ("ROM")) mass storage systems. The data storage may be concentrated or, conversely, it may be distributed. Data maintained by network devices may be stored in the concentrated data storage as well as in the distributed data storage.

A. Network Communications

Figure 2:
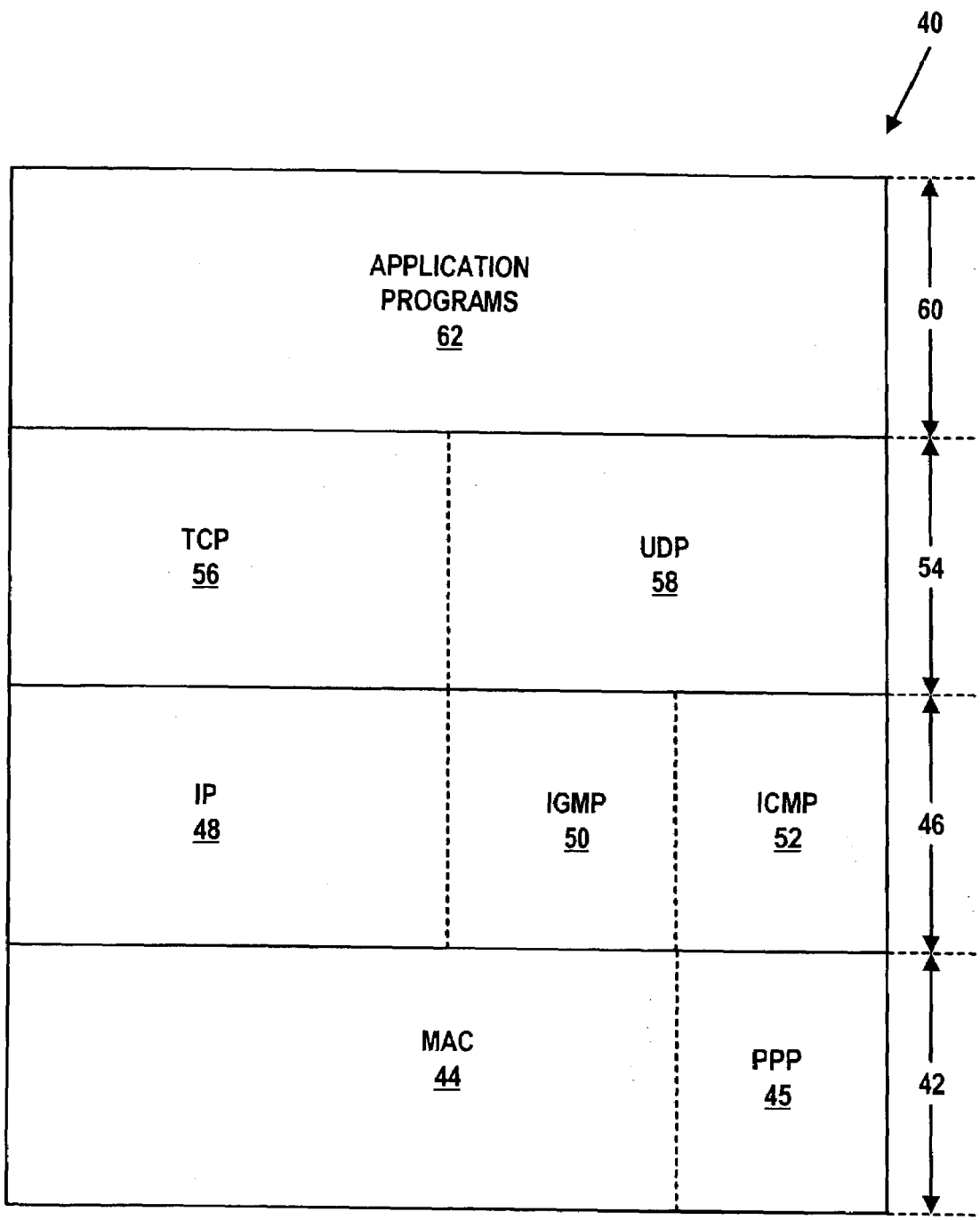
FIG. 2 is second block diagram illustrating an exemplary layered-protocol stack according to an exemplary embodiment.

FIG. 2 is a block diagram illustrating an exemplary layered-protocol stack 40 for communication sessions in the exemplary network system 10 (FIG. 1) and in the exemplary mobile network system illustrated in FIG. 3. Network devices, such as the mobile and non-mobile local network devices 12, 14, 16, 18, 20, 22, 24 and the remote network devices on foreign subnets 30, 32, 34, typically use the layered-protocol stack 40 approach for originating, maintaining, and terminating communication session.

The layered-protocol stack 40 provides a way to connect one network device to another using an underlying physical transmission medium comprising a wireless network, wired network wireless or wired LAN, an optical network, a cable network, and/or any other computer network. The underlying physical transmission medium, which may be referred to as a physical layer, defines the electrical and physical properties of an underlying transmission medium.

In an exemplary embodiment, the layered-protocol stack 40 may be one of the Internet Protocol (IP) suites comprising from lowest-to-highest, a link, a network, a transport and an application layer. The layered-protocol stack 40, however, may contain more or fewer layers may be used, and layer designations other than those of the IP suite may be used for the layers in the protocol stack, as well. For example, layering based on the seven layer Open Systems Interconnection ("OSI") model may be used.

The following is described in reference to the IP. Link layer 42 provides a connection mechanism for network devices to the underlying physical transmission medium or physical layer. The link layer 42 includes a Medium Access Control ("MAC") protocol layer 44, which controls access to the underlying transmission medium via a physical layer. For more information on the MAC layer protocol, see IEEE 802.3. IEEE 802.3 is fully incorporated herein by reference. Link layer 42, however, is not limited to the MAC layer protocol 44, and other link layer protocols may be used. (e.g., other IEEE 802.x protocols).

The link layer 42 also includes a Point-to-Point Protocol ("PPP") layer 45 (referred to hereinafter as PPP 45). Generally, in operation, PPP 45 encapsulates higher-level protocols in PPP headers for transporting communications. PPP 45 may be used to provide dial-up access over a serial communications link, and to provide synchronous as well as asynchronous communications. Details on PPP 45 may be found at Internet Engineering Task Force ("IETF") Request for Comments ("RFC"), RFC-1661, RFC-1662 and RFC-1663, all of which are fully incorporated herein by reference.

Above the link layer 42 is a network layer 46 (also called the "Internet Layer" for Internet Protocol suites). The network layer 46 includes an internet protocol ("IP") layer 48, which uses an IP addressing protocol designed to route traffic within a network and between networks. IP layer 48 (referred to hereinafter IP 48) is described in IETF RFC-791, and is fully incorporated herein by reference. As will be described below, the IP 48 contains support for Mobile IP.

The network layer 46 also includes an Internet Group Management Protocol ("IGMP") layer 50, an Internet Control Message Protocol ("ICMP") layer 52. IGMP layer 50, hereinafter IGMP 50, is responsible for multicasting. For more information on IGMP 50, see IETF RFC-1112, which is fully incorporated herein by reference. ICMP layer 52, hereinafter ICMP 52, is used for Internet Protocol control. The main functions of ICMP 52 include error reporting, reachability testing (e.g., "pinging"), route-change notification, performance, subnet addressing and other maintenance. Details regarding ICMP 52 may be found in IETF RFC-792, which is fully incorporated herein by reference. ICMP 52 can be used without IGMP 50. Both ICMP 52 and IGMP 50 are not required in protocol stack 40.

The network layer 46 may also include a Generic Routing Encapsulation ("GRE") layer (not illustrated). GRE is a protocol for performing encapsulation of data from one arbitrary network layer protocol in another arbitrary network layer protocol. Details regarding GRE may be found in IETF RFC-1701-1702, which is fully incorporated herein by reference.

Above network layer 46 is a transport layer 54. The transport layer 54 includes a Transmission Control Protocol ("TCP") layer 56 and/or a User Datagram Protocol ("UDP") layer 58. The TCP layer 56, hereinafter TCP 56, provides a connection-oriented, end-to-end reliable protocol designed to fit into a layered hierarchy of protocols which support multi-network applications. TCP 56 provides for reliable inter-process communication between pairs of processes in network devices attached to distinct, but interconnected networks.

The UDP layer 58, hereinafter UDP 58, provides a connectionless mode of communications using datagrams in an interconnected set of computer networks. UDP 58 provides a transaction oriented datagram protocol, where delivery and duplicate packet protection are not guaranteed. Both TCP 56 and UDP 58 are not required in protocol stack 40. Either TCP 56 or UDP 58 can be used without the other.

Above the transport layer 54 is an application layer 60. The application layer 60 may include one or more application programs 62. These application programs 62 provide to a network device desired functionality, such as telephony or other communications functionality. The application programs 62 may include voice, video, audio, data or other applications. The application layer 60 may also include application-layer-protocol layers. These application-layer-protocol layers typically provide a subset of the functionality provided by an application program.

The application layer 60 may include a Dynamic Host Configuration Protocol ("DHCP") application program 62, which provides a mechanism/standard for passing configuration information such as IP 48 addresses to network devices on an IP 48 network and other networks. For more information on DHCP see, RFC-1541, and RFC-2131 and RFC-2132, which are fully incorporated herein by reference.

The application layer 60 may also include a Service Location Protocol ("SLP") application program 62, which provides a scalable framework for the discovery and selection of network services. Using SLP, network devices using the Internet need little or no static configuration of network services for network based applications. For more information on SLP see IETF RFC-2608, which is fully incorporated herein by reference.

The application layer 60 may also include a Session Initiation Protocol ("SIP") application program 62, which is an application layer 60 control protocol for creating, modifying, and terminating sessions with one or more participants. SIP sessions may include Internet multimedia conferences, Internet telephone calls (e.g., Voice over IP, "VoIP"), and multimedia distribution. Members in a SIP session can communicate via multicast or via a mesh of unicast relations, or a combination of these. SIP invitations used to create sessions carry SIP session descriptions, which allow participants to agree on a set of compatible media types.

SIP supports user mobility by proxying and re-directing requests to a mobile node's current location. Consequently, mobile nodes can register their current location. Furthermore, SIP is not tied to any particular conference control protocol. SIP is designed to be independent of a lower-layer transport protocols, and SIP may be extended. For more information on SIP, see IETF RFC-2543, "SIP: Session Initiation Protocol", the contents of which are incorporated by reference.

The application layer 60 may also include ITU-T H.323 or H.324 application programs 62. H.323 is the main family of video conferencing recommendations for IP networks. The ITU-T H.323 standard is fully incorporated herein by reference. H.324 is a video conferencing recommendation for using plain-old-telephone-service ("POTS") lines. The ITU-T H.324 standard is incorporated by reference.

The application layer 60 may also include a VoIP application program 62, which in turn may include several other application programs 62, such as H.323 and SIP. The VoIP application program 62 converts a voice signal into a stream of packets, such as IP 48 packets, for transmission into a packet network. The VoIP application 62 may also convert the stream of packets back into a voice signal.

VoIP services typically provide connectivity to traditional circuit-switched voice networks. As noted above, VoIP is typically used with the H.323 protocol and other multimedia protocols. H.323 terminals such as multimedia computers, handheld devices, personal digital/data assistants ("PDA") or other devices such as mobile phones connect to existing wired and wireless networks, such as PSTNs, private wired and wireless networks, and public wireless networks.

H.323 terminals may be LAN-based end terminals for voice transmission. H.323 terminals may support real-time, two-way voice communications. H.323 terminals implement voice transmission functions and may include at least one voice Coder-Decoder ("CODEC") for sending and receiving packetized voice. Examples of such CODECs include (i) Pulse Code Modulation (PCM), (ii) Adaptive Differential Pulse Code Modulation (ADPCM), (iii) Code-Excited Linear Predictive (CELP), (iv) Adaptive Code-Excited Linear Predictive (ACELP), (v) Relaxed Code-Excited Linear Predictive (RCELP), (vi) Selective Mode Vocoder (SMV), (vii) Linear Predictive Coding (LPC), (viii) Sinusoidal Transform Coder (STC), (ix) Improved Multiband Excitation (IMBE), (x) CDMA Qualcomm Code-Excited Linear Predictive (QCELP), (xi) CDMA4000-SMV, (xii) Adaptive Multirate GSM (AMR-GSM), (xiii) Federal Standard 1017, (xiv) IS-54, (xv) IS-641, and/or other CODEC, such as those found in ITU-T CODECS, G.711, G.723, G.726, G.728, G.729.

The application layer 60 may also include a Domain Name System ("DNS") application program 62, which provides replicated distributed secure hierarchical databases for hierarchically storing resource records under domain names.

The application layer 60 may also include an Authentication, Authorization, and Accounting ("AAA") application program 62. AAA application programs 62 provide a classification scheme and exchange format for providing accounting data records (e.g., for call billing, etc.). For more information on AAA applications, see, "Accounting Attributes and Record Formats," IETF RFC-2924, the contents of which are fully incorporated herein by reference.

The AAA applications include, but are not limited to, "Remote Authentication Dial In User Service (RADIUS)" described in IETF RFC-2865, or the DIAMETER protocol, which is used for AAA for Mobile-IP, described in IETF draft <draft-calhoun-diameter-impl-guide-04.txt> entitled "DIAMETER Implementation Guidelines," July 2000, and IETF draft <draft-calhoun-diameter-mobileip-11.txt>, entitled "DIAMETER Mobile IP Extensions," September 2000, all of which are incorporated herein by reference. Other protocols or implementations, and other or equivalent AAA protocols can be used as well.

The application layer 60 may also include a Simple Network Management Protocol ("SNMP") application program 62, which is used to support network management functions. For more information on SNMP layer 62 see IETF RFC-1157, which is fully incorporated herein by reference.

In one embodiment, one or more of network devices may be configured as act as an application server by distributing one or more of the application programs 62 among the network devices. In another embodiment, a single network device may be the application server. Examples of such application servers include SIP servers, H.323 servers, AAA servers, DNS servers, MBR-PR servers, VoIP servers, and/or any other type server. In such an embodiment, network devices may include only an application program layer (e.g., SIP) that communicates with an application program (e.g., SIP) running on the stand-alone application server to provide application functionality. Other or equivalent embodiments may be used as well.

The application layer 60 may further include a Mobile IP application program 62. For Details regarding Mobile IP see "Mobile IP: The Internet Unplugged," by J. D. Solomon, Prentice-Hall, 1998, ISBN-0-13-856246-6. See also Mobile IP, as defined by IETF RFCs 2002–2006, all of which are incorporated herein by reference.

FIG. 3 is a block diagram illustrating an exemplary Mobile Internet Protocol ("Mobile IP") system 64. Mobile IP allows "mobile" nodes to transparently move between different IP 48 subnets. Mobile IP allows a mobile node to dynamically change its network connectivity in a manner that is transparent to protocol layers above the network layer 46 (e.g., TCP 56 or UDP 58). In an exemplary embodiment, support for Mobile IP application programs 62 or Mobile IP application layers is included in the IP 48 layer.

The Mobile IP system 64 includes one or more "non-mobile" network devices 66, 68, 70, 72, 74, 76, and a mobile node 78. The Mobile IP System 64, however, may include hundreds or thousands of mobile nodes. More or fewer non-mobile network devices and more mobile nodes may be used as well. The non-mobile network devices 66, 68, 70, 72, 74, 76, and the mobile node 78 are assigned a network addresses such as IP 48 addresses on a home subnet 80. The home subnet 80 may include a wireless network, a wired LAN, an optical network, a cable network, and/or other computer network. The home subnet 80 is communicatively coupled to an external network 82, such as the Internet or an intranet, via a home agent ("HA") 76. The HA 76 may provide a "gateway/router" function for the home subnet 80.

When mobile node 78 "roams" 84 from its home subnet 80, it periodically transmits Mobile IP "agent solicitation" messages to foreign agents, such as foreign agent ("FA") 86 via external network 82. The FA 86 is foreign with respect to home subnet 80 and resides on a foreign subnet 88 along with one or more foreign non-mobile network devices such as non-mobile network device 90, and 92. The foreign subnet 88 may also include one or more mobile nodes (not illustrated). Like the HA 76, the FA 86 provides a "gateway/router" function for the foreign subnet 88. The foreign non-mobile network devices 90, 92 are assigned network addresses, such as IP 48 addresses, on the foreign subnet 88.

In addition to transmitting "agent solicitation" message while roaming, mobile node 78 listens for Mobile IP "agent advertisement" messages from foreign agents, such as such as FA 86. When roaming mobile node 78 receives an agent advertisement message from FA 86 indicating that it is now on a foreign subnet 88, mobile node 78 registers with the FA 86 and the HA 76. By registering with the HA 76, mobile node 78 notifies the HA 76 that it has roamed 84 away from its home subnet 80.

On home subnet 80, mobile node 78 has a network address, such as IP 48 address 11.0.0.4., and the HA 76 has a network address, such as IP 48 address 11.0.0.7. Mobile and non-mobile network devices having network addresses beginning with a network access prefix of 11.0.0 and a prefix length of 24 bits (i.e., 11.0.0.X/24) belong to home subnet 80. Since the HA 76 is advertising a route to the home subnet 80 at 11.0.0.X/24, it will accept data packets from external network 82 for network addresses with the network access prefix 11.0.0.X/24. For example, the HA 76 may accept data packets for the mobile node 78, given that the home network address of the mobile node 78 is of 11.0.0.4.

The FA 86, on the other hand, has a network address of 12.0.0.4 on the foreign subnet 88. The FA 86 advertises a route to the foreign subnet 88 with network access prefix length of 12.0.0.Y/24. Thus, FA 86 will accept data packets that have a network address of 12.0.0.Y/24 on the foreign subnet 88. For example, the FA 86 will accept data packets for the non-mobile network devices 90, and 92 having a network address of 12.0.0.1.

The mobile node 78 uses its home network address of 11.0.0.4 on the home subnet 80 to register with the FA 86 and the HA 76. After registration of the mobile node 78, the FA 86 will also accept data packets for the mobile node 78 at the specific home network address 11.0.0.4 as well as data packets that have a network prefix of 12.0.0/24. The FA 86 may also assign a temporary foreign network address called a care-of-address ("COA") on the foreign subnet 88 to the mobile node 78 (e.g., 12.0.0.5).

B. Third Generation Mobile Architecture

Third-generation ("3G") architecture, supports data rates ranging from about 144K bits-per-second to about 2M bits-per-second, ("bps") packet switched services. As noted above, 3G networks encompass a range of wireless technologies.

The ITU-T guidelines for 3G networks are included in the IMT-2000 standard. The ITU-T IMT-2000 standard is incorporated herein by reference. See also, the TIA TSB115, Wireless IP Network Architecture standard, TIA IS-835, Wireless IP Network Standard, and IS2000 and IS2001 standards for CDMA2000, the contents of all of which are incorporated by reference.

3G networks implementing IS2000 and IS2001 allow mobile nodes to roam from network-to-network using Mobile IP. Many of these mobile nodes may be wireless phones, wireless PDAs, or similar devices that need to establish, maintain, and terminate call or communication sessions. Call control protocols, such as SIP or H.323, may be used for session control. These call control protocols may allow a local proxy to be used on foreign networks so that local policy and/or bandwidth management can be applied to local and remote sessions. In the current generation of 3G networks, a local proxy is typically used on all foreign networks. A local proxy may be included in the FA 86 or in a stand-alone local proxy server or application program on the foreign network 88.

Figure 4:
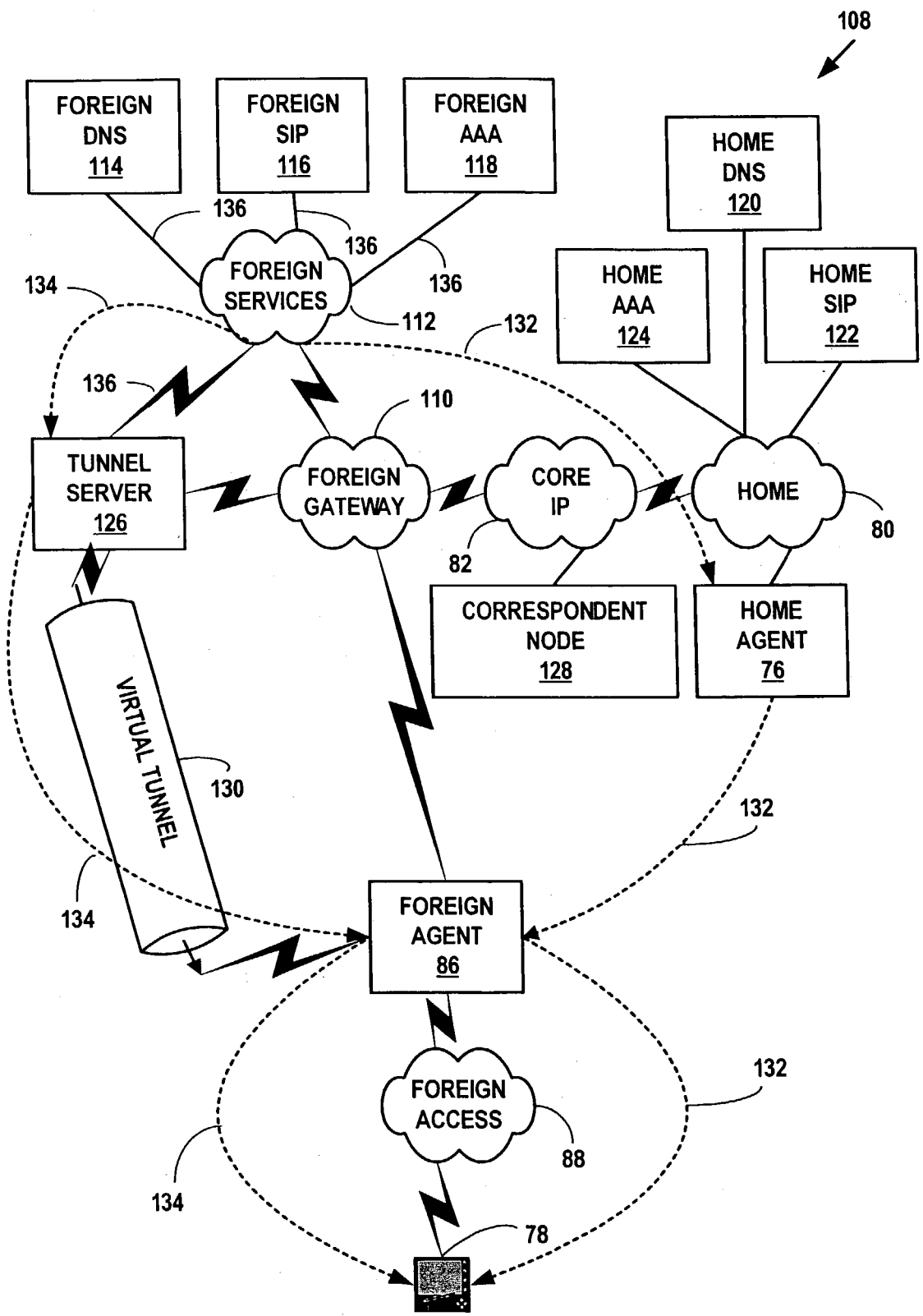
FIG. 4 is a fourth block diagram illustrating an exemplary data network according to an exemplary embodiment.

FIG. 4 is a block diagram illustrating an exemplary 3G system 108. The exemplary 3 G system 108 includes a foreign gateway network 110, a foreign services network 112, a foreign DNS application 114, a foreign SIP application 116 and a foreign AAA application 118. The exemplary 3G system 108 also includes a home DNS application 120, a home SIP application 122, a home AAA application 124, a tunnel server ("TS") 126 and a correspondence node ("CN") 128. Other embodiments having more, fewer or other components may also be used in 3G system 108.

The home DNS application 120, home SIP application 122, home AAA application 124, tunnel server 126 and correspondence node 128 are illustrated as separate components. In other embodiments, all or selected ones of these components may be combined into a single or smaller number of components. For example, some of the other components may be integrated into HA 76.

The foreign gateway network 110 and foreign services network 112 are illustrated as separate from foreign network 88. The foreign gateway network 110 may include an IP 48 network or other network, the foreign services network 112 may include (i) an IP 48 network, (ii) a Public Switched Telephone Network ("PSTN"), (iii) a packet data service node ("PDSN"), and/or (iii) other network or network device. In one embodiment, the FA 86 is associated with a PDSN. Other types of foreign agents may be used. Further, the foreign gateway network 110 and the foreign services network 112 may all be integral to foreign network 88.

In an exemplary embodiment, the foreign gateway network 110 and the foreign services network 112 may be integral to foreign network 88. Alternatively, the foreign network 88, foreign gateway network 110 and foreign services network 112 are separate networks, as shown. For simplicity, the separate foreign networks are collectively referred to as "foreign network 88."

Generally, a PDSN is a required component in most, but not all 3G networks 108. For mobile node 78, a PDSN is the point of entry into the wireless packet data network. The PDSN performs two basic functions: (1) it exchanges packets with mobile node 78 over a wireless network; and (2) it exchanges packets with other IP 48 networks. The PDSN uses associated AAA servers for user authentication and traffic management. Further, the PDSN forwards traffic to a gateway router/home agent (GR/HA) at the designated IP network. Other network access devices or servers may carry out the functionality of a PDSN as well.

The PDSN may be coupled with a Packet Control Function ("PCF"). The PCF separates multiple IP 48 data transmissions and connects them to a core IP infrastructure 82. A PCF allows mobile VoIP and IP multimedia calls to continue through the core IP network 82.

The exemplary 3G system 108 includes a virtual tunnel 130, a default communications path 132 a new communications path 134, and a tunnel server communications path 136. The default communications path 132 includes a communications path from the foreign services applications 114, 116, 118 on a foreign network to the HA 76 on the home network 80 to the FA 86 on the foreign network 88, and on to the mobile node 78 on the foreign network 88. The new communications path 134 includes a communications path from the foreign services applications 114, 116, 118 to the tunnel server 126 on a foreign network to the FA 86, and on to the mobile node 78 on the foreign network 88. The tunnel-server-communications path 136 includes a communications path or a reverse communications between the foreign service applications 114, 116, 118 and the tunnel server 126.

Also illustrated in FIG. 4 is HA 76, mobile node 78, home network 80, external network 82, FA 86, and foreign network 88 as described above (see FIG. 3). The home network 80 and the foreign network 88 may be a wireless network, a LAN, an optical network, a cable network, and/or other equivalent high-speed computer network.

FIG. 4 illustrates only one FA 86. In most implementations, however, plural FAs are used since large numbers of mobile nodes are supported. Further, the exemplary 3G systems may contain more, fewer or equivalent components.

In one embodiment, the exemplary 3G system 108 includes an all IP 48 network comprising of an IP 48 radio access network ("IP-RAN"), a PDSN, a PCF and an IP Mobility Core Network 82. Other embodiments with more or fewer components may also be used. These exemplary networks may support 2G, 2.5G and 3G wireless interface technologies including Global System for Mobile Communications, ("GSM"), Generic Packet Radio Services ("GPRS"), Personal Communications Services ("PCS"), a Cellular Digital Packet Data ("CDPD"), Wireless Application Protocol ("WAP"), Digital Audio Broadcasting ("DAB"), Bluetooth, 802.11a, Wireless LAN, Wifi/802.11b, or other types of wireless network interfaces. These multi-generational wireless interface technologies support telephony, Short Message Services ("SMS"), paging, voice mail, call forwarding, faxing, caller ID, Internet access, and e-mail, to name a few of the services available.

C. Mobile Node Communication in a 3G Network

Figure 5:
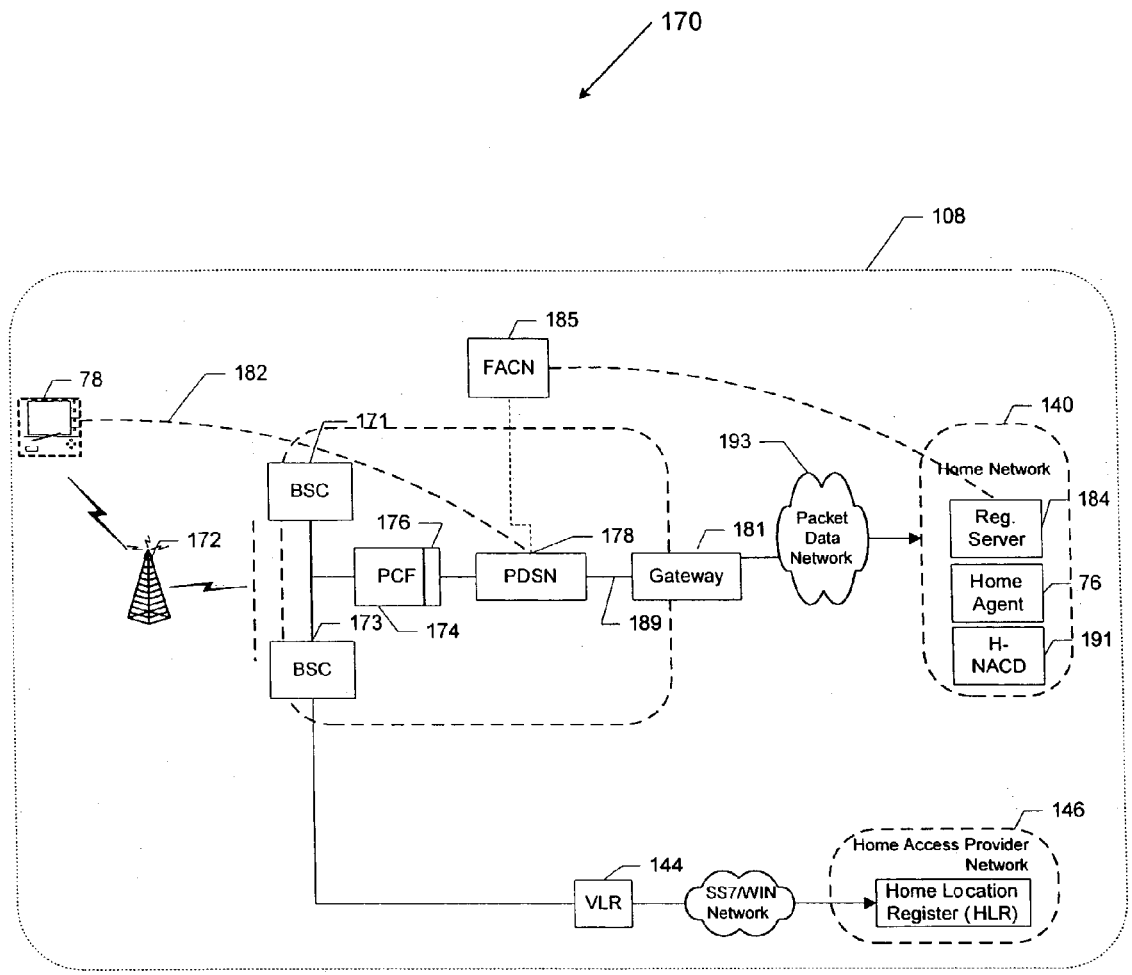
FIG. 5 is a fifth block diagram illustrating an exemplary portion of the 3G network according to an exemplary embodiment.

FIG. 5 is a block diagram illustrating an exemplary portion 170 of the 3G network 108, which provides support for communication between wireless mobile node 78 and the 3G network 108. The portion 170 includes a mobile node 78, a base node ("BTS") 172, base node controllers ("BSC") 171 and 173, a PCF 174, a radio packet interface ("RPI") 176, PSDN 178, a gateway 181, a foreign agent control node ("FACN") 185, a Visitor Location Register (VLR) 144, and a home-access-provider network 146.

Although FIG. 5 shows only two BSCs, i.e., BSCs 171 and 173, the portion 170 of the 3G system 108 typically includes a large number of BSCs. Further, although FIG. 5 shows only a single BTS, i.e., BTS 172 coupled to BSC 173, each BSC may be connected to a greater or a fewer number of BTSs. Moreover, although FIG. 5 shows only one PDSN, i.e., PDSN 178, more, or less PDSNs may be included in portion 170.

The mobile node 78 is communicatively coupled with the BTS 172 over an air interface. Communications transmitted across the air interface conform to the air interface protocol of the wireless communication format. For instance, in a CDMA format the protocol may be enhanced variable rate vocoder (EVRC) or IS-127. The BTS 172 in turn may be communicatively coupled to the BSC 173 and/or BSC 171. Communications transmitted across the interface connecting the BTS 172 and BSC 173 or BSC 171 may use a protocol such as IS-707 or IS-127. Other protocols are possible as well.

BSC 171 and 173 are in communication with the VLR 144, which may hold a copy of the user profile, and the home-access-provider network 146 via SS7, WIN or other intelligent signaling system system. The home-access-provider 146 may contain HLR 148, which contains is the central information repository for the wireless mobile node 78 for enhanced and other telecommunication services for wireless voice systems that use the SS7 or other out-of-band signaling networks. To access the information in the HLR, a standard signaling system such as AIN or IS-41 may be used.

BSCs 171 and 173 are also in communication with PCF 174. Communications transmitted between BSCs 171 and 173 may be transmitted according to a protocol such as G.711 or other wireless communication format. PCF 174 is also in communication with PDSN 178. The RPI 176, which is used for packet data signaling, provides a link between PCF 174 and PDSN 178.

The RPI 176 defines two logical channels: an A10 channel for data and an A11 channel for signaling. A11 signaling may be based on Mobile IP messages including Registration Request ("RRQ") and Registration Reply ("RRP"), Registration Update ("RUP") and Registration Acknowledge ("RACK"). Data from the mobile node 78 may be encapsulated in GRE packets and tunneled from the PCF 174 to the PDSN 178 over an A10 channel, where it is unencapsulated and processed further.

The PDSN 178 is in communication with the gateway 181 via a Pi interface 189. Communications transmitted over the Pi interface 189 may be transmitted according to Mobile IP. Data sent over the Pi interface 189 may be transmitted as UDP over Mobile IP; however, other transmission protocols may be used. The gateway 181 is in communication with the packet data network (PDN) 193. Communications transmitted between the gateway 181 and PDN 193 may be exchanged using IP 48.

The wireless mobile node 78 may establish a PPP 45 data link 182 that terminates at the PDSN 178. The PPP 45 data link 182 helps provide a "keep-alive" point-to-point-data link for higher-level application services 62 such as VoIP, and/or H.323.

PDN 193 is in communication with the home network 140. Similar to the Pi interface 189, communications exchanged between the PDN 193 and the home network 140 may use Mobile IP, UDP over IP, and/or other transmission protocols as well.

The home network 140 may contain HA 76, a registration server 184, and a home network-access-control device (H-NACD) 191. The H-NACD 191 may comprise one or more network-access servers that communicate according to the RADIUS protocol or the DIAMETER protocol. The H-NACD 191, however, may use other protocols. The H-NACD 191 may have access to and/or maintain wireless mobile node 78 packet-data-provisioning information from the user profile. The H-NACD 191 may be used to authenticate and determinate the parameters of a wireless mobile node's 78 packet-data session.

In one exemplary embodiment, the 3G network 108 is implemented with a foreign agent control node 185 ("FACN"), which provides a signaling control node that enables advanced Mobile IP signaling applications. The FACN 185 also provides a control mechanism for managing multiple PDSNs, such as PDSN 178, thereby allowing wireless service providers to deploy a highly distributed architecture that is scalable and robust.

The FACN 185 allows creation of a virtual PDSN environment, which helps eliminate address mapping between static radio nodes and PDSN IP 48 addresses. The FACN 185 helps ensure efficient use of multiple PDSNs within the 3G network 108 by providing PDSN redundancy, optimal PDSN selection, and PDSN load balancing.

A registration server 184 is also in communication with the PDSN 178 and the FACN 185. Optionally, a pre-paid mobile service provider is able to configure an IP 48 address used for the registration server 184. The registration server 184 is responsible for informing the wireless mobile node 78 that its pre-paid mobile services have expired, allows the wireless mobile node 78 to purchase additional time or bytes or packets, etc. immediately, and responsible for pre-paid billing and accounting activities. To facilitate such responsibilities, the registration server 184 may send eXtensible Markup Language ("XML") messages to Wireless Application Protocol ("WAP") capable mobile nodes 78, as well as Hyper Text Markup Language ("HTML") messages to other types of mobile nodes 78 or relay-mode laptops that are capable of web access.

D. Network Architecture for 3G to SS7 Network Communications

Figure 6:
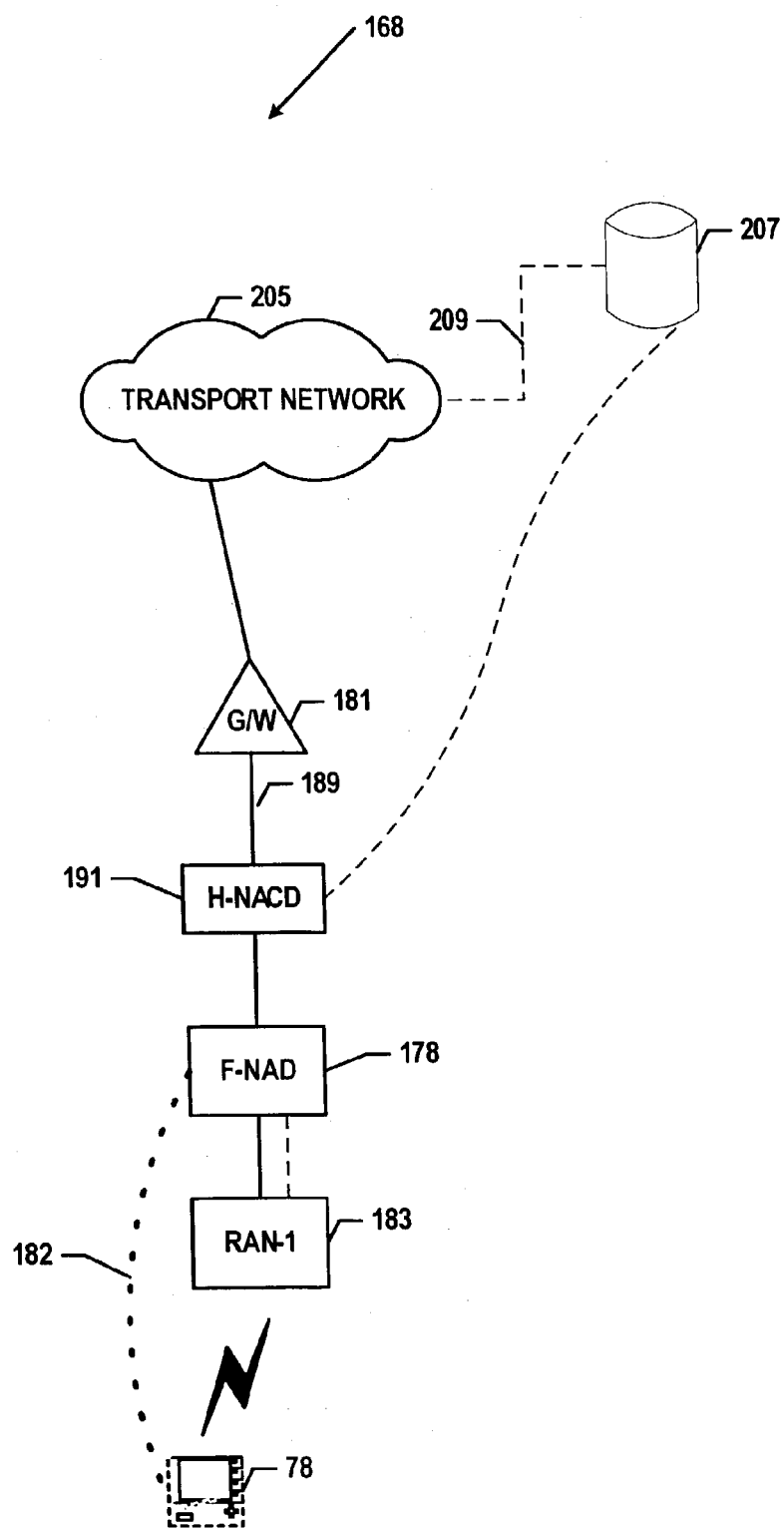
FIG. 6 is a seventh block diagram illustrating an exemplary portion of a communications network that provides prepaid billing system support for simultaneous communications according to an exemplary embodiment.

FIG. 6 is a simplified block diagram illustrating an exemplary portion 168 of a communications network that provides prepaid billing system support for simultaneous communications. The portion 168 includes the mobile node 78, a radio access network ("RAN1") 183, a network access device ("NAD") 178, a gateway 181, a network-access-control device ("NACD") 191, a transport network 205, and a prepaid-billing system 207.

Although FIG. 6 shows only one RAN, i.e., RAN1 183, the portion 168 of the communication network typically includes a large number of RANs. Moreover, although FIG. 6 shows only one NAD, i.e., NAD 172, more, or less NADs may be included in portion 168.

The mobile node 78 is communicatively coupled with the RAN1 183 via an air interface. Communications transmitted across the air interface conform to an air interface protocol of the wireless communication format, such as the air interface protocol for CDMA2000. The RAN1 183 in turn may be communicatively coupled to the NAD 178. Communications exchanged between the RAN 1 183 and NAD 178 may use a protocol such as G.711 or other wireless communication format.

RAN1 183 may also provide packet data signaling. This packet data signaling may be separated from the data using two logical channels, such as an A10 channel for data and A11 channel for signaling. The A11 signaling may be based on IP messaging, Mobile IP messaging or other signaling system messaging. Data from the mobile node 78 may be encapsulated in packets and tunneled to the NAD 178 over the A10 channel, where it is un-encapsulated and processed further.

The mobile node 78 may establish a data link 182 that terminates at the NAD 178. This data link 182 is used to help provide a "keep-alive" point-to-point-data link for higher-level application services 62, such as VoIP, and/or H.323. The NAD 178 is in communication with the gateway 181 via a Pi interface 189. Communications exchanged over the Pi interface 189 may use Mobile IP or other transmission protocol. Data sent over the Pi interface 189 may be transmitted as UDP over Mobile IP; however, other transmission protocols may be used.

The gateway 181 is in communication with NACD 191. The NACD 191 may comprise a one or more network-access servers, such as AAA server or a FACN, that communicate using the RADIUS protocol, the DIAMETER protocol, or other AAA services protocol. The NAD 178 is also in communication with the NACD 191. The NACD 191 may maintain wireless mobile node 78 packet-data-provisioning information. This packet-data provisioning information may be stored in a user profile record (hereinafter referred to as "user profile") in a data store that is accessible to the NACD 191. Further, the NACD 191 may be used to authenticate and de-terminate the parameters of a wireless mobile node's 78 packet-data session.

Transport network 205 is in communication with the prepaid-billing system 207. The transport network 205 may establish a signaling link 209 with the prepaid-billing system 207 using a signaling system, such as IS-41 or AIN. Transport network 205 is also in communication with NACD 191. Similar to the Pi interface 118, communications exchanged between the transport network 120 and the NACD 191 may use Mobile IP, UDP over IP, and/or other transmission protocols. Transport network 205 may be a SS7 network or other out-of-band signaling network. Signaling exchanged between the gateway 181 and transport network 205 may use IS-41, AIN or other standardized signaling system.

2. Support for Prepaid Billing for Simultaneous Communication Sessions

Figure 7:
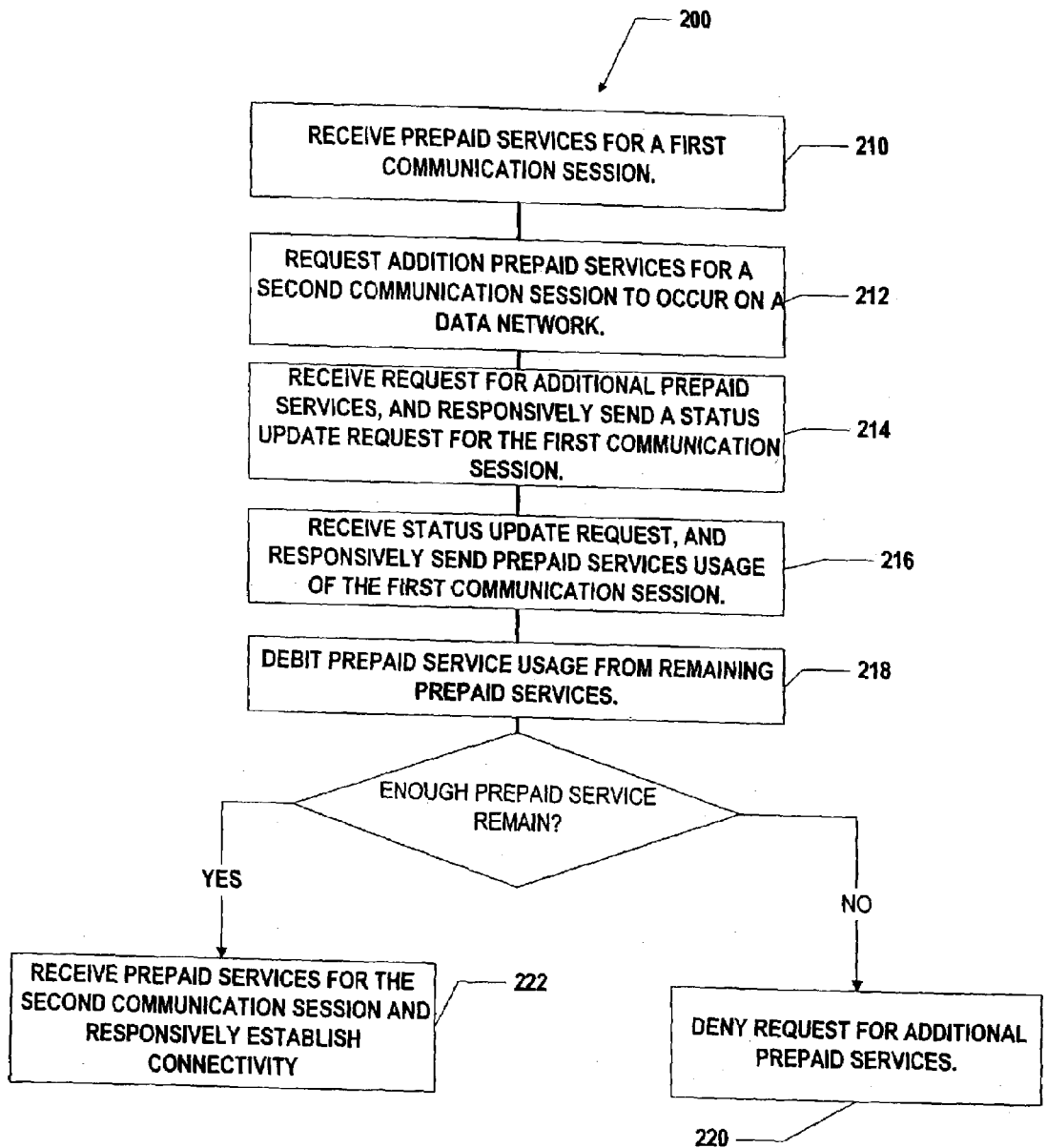
FIG. 7 is a flow diagram illustrating a method for providing prepaid billing system support using a voice-prepaid system for concurrent communication sessions according to an exemplary embodiment.

FIG. 7 is a flow diagram illustrating a method 200 for providing prepaid billing system support using a voice-prepaid system for concurrent communication sessions in which at least one of the concurrent communication sessions occurs in a data network.

Referring to FIG. 7, at block 210, a first network access device, such as a MSC, BSC, a PDSN, a AAA server and/or NAD 178 receives from the prepaid billing system 207 prepaid billing services for a first-ongoing-communication session for the mobile node 78. This first-ongoing-communication session may be a voice session, a data session or a combination of both. The first-ongoing-communication session may be engaged in a circuit switched network, such as a PSTN, or a packet data network, such as the 3G network 108. As such, the first-network-access device may be a SCP, a proxy server to an SCP, or other circuit-switched-network element.

The prepaid billing services may be maintained in one ore more prepaid user account or user profile account in or accessibly to the prepaid billing system 207. Alternatively, the prepaid billing services may be maintained in a second prepaid user account or user profile record on one or more proxy servers on the 3G network 108. The second prepaid user account may maintain a copy of the information contained in the user account in the prepaid billing system 207. Further, as noted above, contained in the HLR and VLR is a data store that houses, the user profile information on some voice and data networks. Accordingly, the prepaid billing services may be maintained in the data store on the HLR and VLR as well.

In one embodiment, the prepaid-user account (and the copy in the second-prepaid-user account) contains account information for prepaid mobile services based on individual or combinations of the measurement methods provided for the different type of services available. Some examples of measurement methods are listed in Table 1 below. However, more, fewer or other pre-paid mobile services can also be used.

TABLE 1

| | |
|---|---|
| Time: | Subscribers can purchase a specific amount of transmit and/or receive time during which they can use wireless voice or data services. Note that since 3G services can be always on, time spent in active state may be counted towards usage as well as time spent in dormant state may be counted, depending on the plan purchased. |
| Bytes Received: | Subscribers can purchase a package (as determined by the carrier) that entitles them to access wireless data services and receive a specific number of data bytes received. |
| Bytes Transmitted: | Subscribers can purchase a package (as determined by the carrier) that entitles them to access wireless data services and transmit a specific number of data bytes transmitted. |
| Packets Received: | Subscribers can purchase a package (as determined by the carrier) that entitles them to access wireless data services and receive a specific number of data packets received. |
| Packets Transmitted: | Subscribers can purchase a package (as determined by the carrier) that entitles them to access wireless data services and transmit a specific number of data packets transmitted. |

At block 212, a second network access device, such as a PDSN, FACN or NAD 178, in a data network, such as 3G network 108, request from the prepaid user account additional prepaid services for a second communication session. The second communication session may be a voice over packet data, e.g., VoIP, or other packet data communication. The request for prepaid services may be made from mobile node 78 or another second mobile node. The prepaid services requested may be based on individual or combinations of the measurement methods provided for the different type of services available, such as those listed in Table 1 above. More, fewer or other pre-paid mobile services can be used as well.

At block 214, the prepaid billing system 207 receives or otherwise detects the request for additional prepaid services for the second communication and responsively sends to first-network-access device 178 the a status update request so that the prepaid billing system can update the prepaid user account with the amount of available prepaid services. Since the first-network-access device may reside in the SS7 network, WIN network, 3G network 108 or other data network, the status update request message may include a mobile node identifier, such a the mobile node's MIN. This is particularly important for a data network because the prepaid billing system 207 does not maintain, nor is it able to determine (without aid of the second-network-access device 178) the address of the mobile node 78 when the operating in such network.

In 3G network 108, the first-network access device, which may be a AAA server, a PDSN, a FACN, or the second-network-access device 178, may contain one or more translation tables or other databases with accompanying logic for converting the mobile node identifier supplied in the status-update-request message to the mobile node address on the 3G network 108. The mobile node address on the 3G network 108 may be, for example, an assigned IP address or a Mobile IP address care-of address.

At block 216, the first-network-access device 178 receives the status-update-request message and responsively sends to the prepaid billing system 207 the prepaid-services usage for the ongoing first communication session. The prepaid-services usage for the first communication session may include the amount of prepaid services already consumed as well as usage rate, and other statistical information for the first ongoing communication session. This information may be useful in determining the amount of prepaid services that may be consumed before a next status-update request.

At block 218, the prepaid billing system 207 receives the prepaid-services usage for the first ongoing communication session and responsively debits or otherwise accounts for the prepaid-services usage from the remaining prepaid services in the prepaid user account. At block 220, the prepaid billing system performs one or more tests to determine if enough prepaid services are available for the second communication session. These tests may use the statistical information sent by the first-network-access device with the prepaid-services usage information. For instance, if the drawdown rate of prepaid services will exceed the amount of prepaid services available before a next prepaid-usage update, the prepaid billing system 207 may reject or deny the request for additional prepaid services for the second communication session.

If enough prepaid services are available, the prepaid billing system 207 sends to the second-network-access device 178 prepaid services for the second communication session. On the other hand, if an insufficient amount of services remain in the prepaid user account after taking into account the prepaid-services usage, the prepaid billing system 207, at block 220, denies the request for additional prepaid services for the second communication session.

At block 222, the second-network-access device 178 receives the prepaid services for the second communication session. Thereafter, the second-network-access device 178 establishes connectivity for the second communication and draws services from prepaid user account. In an exemplary embodiment, during connectivity of both the first-ongoing and second communication session, the prepaid billing system 207 may make periodic usage updates requests to both the first-network-access device and the second-network access device 178. In response to these requests, the first-network access device and second-network-access device 178 may send the prepaid-services usage for the first-ongoing and second communication session, respectively. These periodic requests and responses may increase in frequency as the amount of remaining prepaid services in the prepaid user account diminishes.

When either the first ongoing communication session or the second communication session ceases, the prepaid billing systems receives from the first-network access device or the second-network-access device, the prepaid-services usage for the first ongoing communication session and the second communication session, respectively.

The foregoing steps illustrate method 200 with an exemplary embodiment. The method 200, however, is not limited to these steps. Other embodiments with other steps can be used to practice method 200, as well.

Further, the foregoing description indicates carrying out method 200 for two communications sessions. The method 200, however, may be carried out for multiple, simultaneous communications sessions. Since each communication session is considered a separate communication session, method 200 may be carried out for each communication session in the identical or similar manner as described above, but method 200 may be carried out in other ways as well. The multiple, simultaneous communication sessions may (i) originate and terminate from the one or more wireless mobile nodes, (ii) connect through the one or more network-access devices, (iii) tunnel from one network-access device to other network-access devices, (iv) be handed-off (e.g., soft, fast, and/or hard hand-off) from one network-access device other access devices, and/or (v) be eligible to receive prepaid services from the same user profile.

Figure 8:
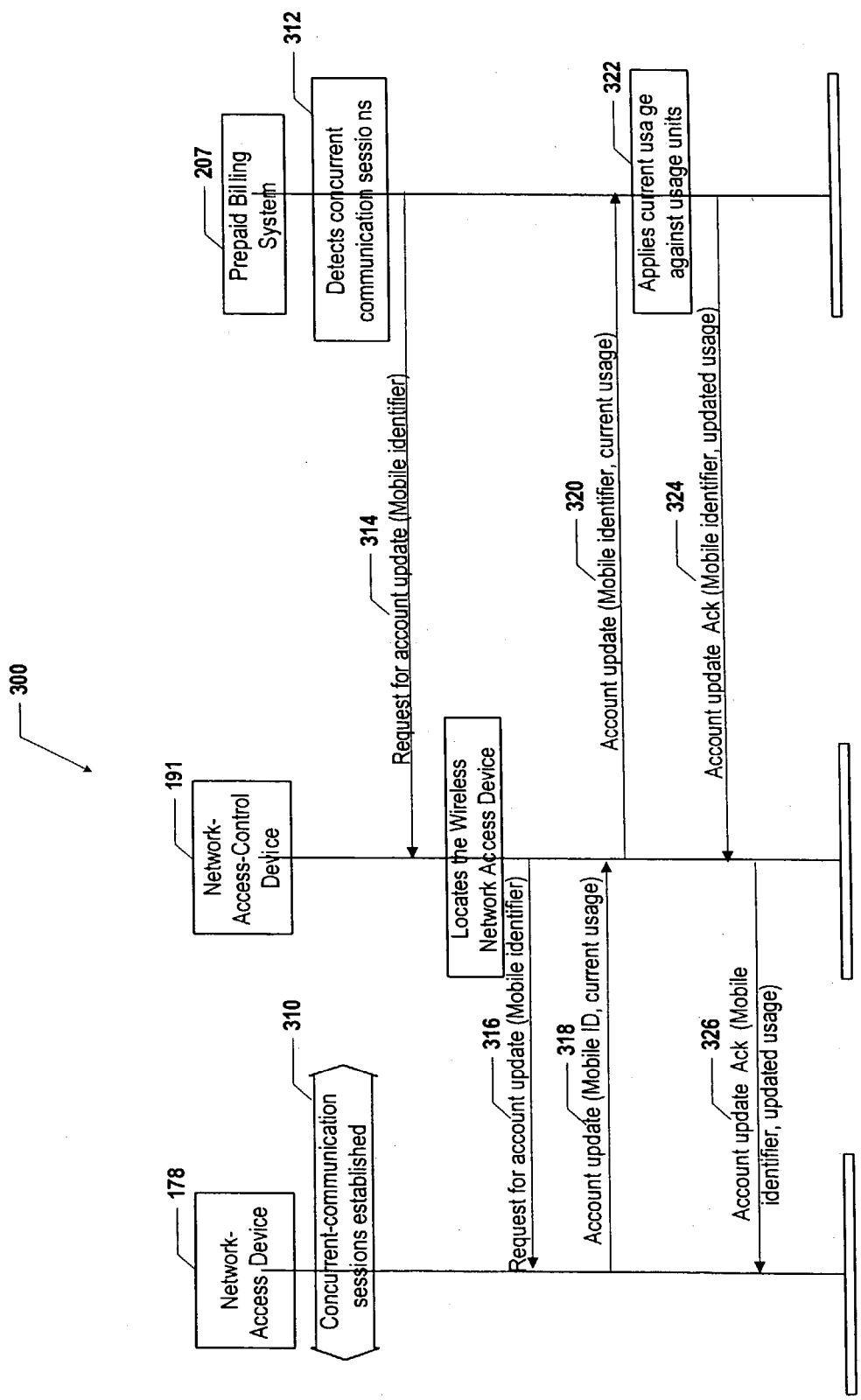
FIG. 8 is a first call flow diagram illustrating an exemplary call flow for providing prepaid billing system support using a voice-prepaid system for concurrent communication sessions according to an exemplary embodiment.

FIG. 8 is a call flow diagram illustrating an exemplary call flow 300 for providing prepaid billing system support using a voice-prepaid system for concurrent communication sessions in which at least one of the concurrent communication sessions occurs in a data network.

Referring to FIG. 8, at block 310, at least two concurrent-communication sessions on a wireless network are established. The first of the at least two concurrent-communication sessions carries data content and the second of the at least two concurrent-communication sessions carries voice content. In an exemplary embodiment, the first of the at least two concurrent-communication sessions is associated with mobile node 78. In addition, the second of the at least two concurrent-communication sessions is associated with mobile node 78 or a second mobile node.

Further, the first of the at least two concurrent-communication sessions may be a circuit-switched voice communication session or alternatively a packet data communication, voice or otherwise. The second of the at least two concurrent-communication sessions may be a voice over packet data or a packet data communication.

At block 312, the prepaid billing system 207 detects the two concurrent-communication sessions. Detection may include receiving simultaneous or sequential requests for prepaid services for the prepaid user account. Detection may also include receiving network access requests from one or more network-access-control devices such as a separate AAA server, the NACD 191, and/or the FACN 185.

After detecting the two concurrent-communication sessions, the prepaid billing system 207 sends to the network-access-control device via the transport network 205 using an a signaling link an account-update-request message 314 for the first of the concurrent-communication sessions. Communications traversing this signaling link may be exchanged using IS-41 or another signaling system. The account-update-request message 314 may include a mobile node identifier, such as the mobile node's MIN, MDS, ESS or any other mobile identifier.

At block 316, after receiving the account-update-request message 314, which contains the mobile node identifier, the network-access-control device locates the mobile node 78 using an internal translation table or database. In turn, the network-access-control device relays to the NAD 178 the account-update-request message 316, which contains the mobile node identifier. While the network-access-control device may simply relay the account-update-request message 314, the account-update-request message 314 may be translated or otherwise converted to another protocol for transmission the NAD 178. For instance, the account-update-request message 315 may be translated into a second-account-update-request message, which may be communicated using Mobile IP or other transmission protocol.

In response to the relayed request, the NAD 178 sends to the network-access-control device an account-update message 318. This account-update message 318 may contain the mobile node identifier and the current usage. The current usage may be in terms of packet data, e.g., bytes or octets, or time.

The network-access-control device receives the account-update message 318, and relays it to the prepaid-billing system 207 in a second account-update message 320. The second account-update message 320 may contain the mobile node identifier already in the format for the prepaid billing system 207. Alternatively, the network-access control device may translate the mobile node identifier into the format used by the prepaid billing system 207. The second account-update message 320 may also contain the current usage, which may be likewise converted or translated for the type of measurement units used by the prepaid billing system 207. Further, the second-account-update message 320 may be translated or otherwise converted for transmission.

At block 322, the prepaid-billing system 207 updates the prepaid user account in response to the receiving the account-update message 320 from the network-access-control device. Updating the prepaid user account may include debiting the prepaid services usage of the first of the at least two communication sessions from the prepaid services remaining prepaid user account. Updating the prepaid user account may include statistical and other algorithmic processing as well.

After updating the prepaid user account, the prepaid-billing system 207 may send to the network-access-control device an account-updated-acknowledgment message 324. This account-updated-acknowledgment message 324 may contain the mobile node identifier so that the network-access-control device can locate the mobile node 78 and the serving NAD 178. The account-updated-acknowledgment message 324 may also include an updated usage allowance for the first of the two concurrent communication sessions.

The account-updated-acknowledgment message 324 may also be sent to the network-access device 178 for granting prepaid services for the second of the at least two concurrent-communication sessions. Accordingly, the mobile node identifier may be the same mobile node identifier for both the first and second of the at least two concurrent-communication sessions, if, for example the mobile node 78 communicates using two channels. Alternatively, the mobile node identifier may differ if the first and the second of the at least two concurrent-communication sessions are carried by mobile node 78 and another mobile node.

The network-access-control device may translate or convert the mobile node identifier, the updated usage allowance, and the message itself for transmission to the NAD 178. After translation, the network-access-control device relays to the NAD 178 a translated account-updated-acknowledgment message 326, which may contain a translated mobile node identifier and translated updated usage allowance. Alternatively, the network-access-control device may relay the account-updated-acknowledgment message 324 un-translated.

The foregoing steps illustrate the call flow 300 with an exemplary embodiment. The call flow 300, however, is not limited to these steps. Other embodiments with other steps can be used to practice call flow 300, as well.

Further, the foregoing description indicates carrying out call flow 300 for two communications sessions. The call flow, however, may be carried out for multiple, simultaneous communications sessions. Since each communication session is considered a separate communication session, call flow 300 may be carried out for each communication session in the identical or similar manner as described above, but call flow may be carried out in other ways as well. The multiple, simultaneous communication sessions may (i) originate and terminate from the one or more wireless mobile nodes, (ii) connect through the one or more network-access devices, (iii) tunnel from one network-access device to other network-access devices, (iv) be handed-off (e.g., soft, fast, and/or hard hand-off) from one network-access device other access devices, and/or (v) be eligible to receive prepaid wireless services from the same user profile.

Figure 9:
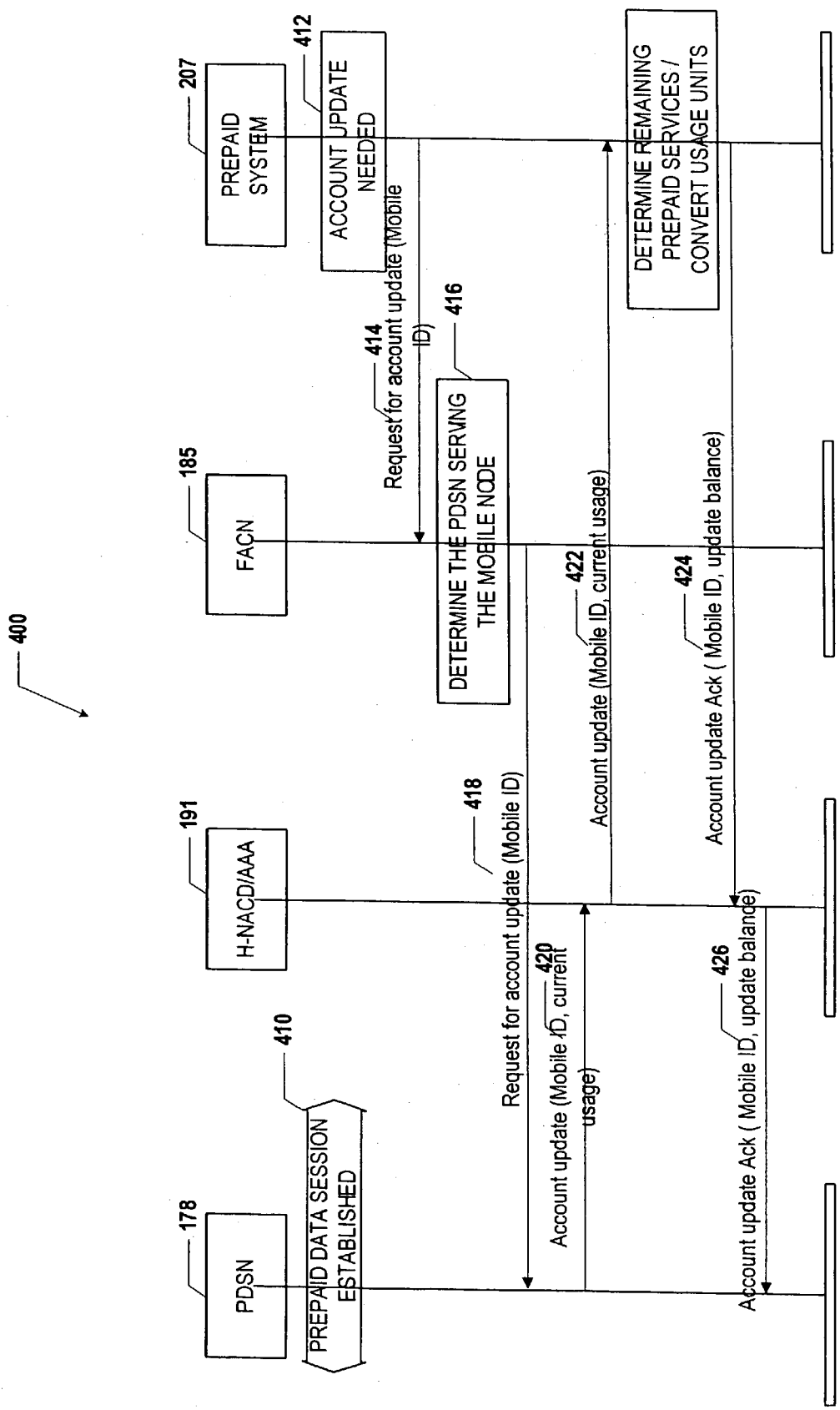
FIG. 9 is a second call flow diagram illustrating an exemplary call flow for providing prepaid billing system support using a voice-prepaid system for concurrent communication sessions according to an exemplary embodiment.

FIG. 9 is a call flow diagram illustrating an exemplary call flow 400 for providing prepaid billing system support using a voice-prepaid system for concurrent communication sessions in which at least one of the concurrent communication sessions occurs in a data network.

Referring to FIG. 9, at block 410, the concurrent-communication sessions on a wireless network are established via PDSN 178. A first and a second of the concurrent-communication sessions carry data content, such as voice over packer data or "VoIP. In an exemplary embodiment, the first of the concurrent-communication sessions is associated with a first channel of mobile node 78. And the second of the concurrent-communication sessions is associated with a second channel of mobile node 78 or a second mobile node.

At block 412, the prepaid billing system 207 detects both the first and the second the concurrent-communication sessions. Detection may include receiving simultaneous or sequential request for prepaid services for the prepaid user account. Detection may also include receiving network access requests from one or more network-access-control devices such as a separate AAA server, the H-NACD 191, and/or the FACN 185.

In response to the detecting both the first and the second of the concurrent-communication sessions, the prepaid billing system 207 determines whether the prepaid user account requires an update. For instance, the PDSN 178 may manage the prepaid billing in the 3G network 108. Consequently, the prepaid billing system 207 may respond to requests that are not managed on the PDSN 178. If the prepaid billing system 207 determines a need for a status update for the concurrent-communication sessions, it sends to the FACN 185 a status-update-request message 414 for both the first and the second of the concurrent communication sessions.

The status-update-request message 414 may be sent to the FACN 185 over an IP link, a Mobile IP link, a SS7 link, or other signaling link. The status-update-request message 414 may contain the mobile node identifier, such as the directory-dialed number. The FACN 185, at block 416, determines that PDSN 178 is serving the mobile node 78 (and the second mobile node, if any), since one of the functions of the FACN 185 is to manage multiple PDSNs and manage the call flow and session activity for each mobile node communicating with the plurality of PDSNs.

The FACN 185 may translate the mobile node identifier received with the status-update-request message 414 using internal translation tables and/or databases for locating the mobile node 78 and the corresponding PDSN 178.

In turn, the FACN 185 sends to the PDSN 178, translated or un-translated, a second-status-update-request message 418. The second-status-update-request message 418 may contain the mobile node identifier, which in an exemplary embodiment is an IP address, a Mobile IP care-of address or other data-network address. Responsively, the PDSN 178 sends to the H-NACD 191 or other AAA server an account-update message 420 for both the first and second of the at least one communication session. The account-update messages 420 may contain the data-network address of the mobile node 78 (and the second mobile node, if any) and current usage for both the first and second of the concurrent-communication sessions.

When the H-NACD 191 receives the account-update messages 420, it may relay to the prepaid billing system 207 the same message. Alternatively, the H-NACD 191 may translate the account-update messages 420 for transmission to the prepaid billing system 207. The transmission to the prepaid billing system 207 may include a IP to IS-41 conversion, a Mobile IP to AIN signaling conversion, as well as other packet data to circuit switched signaling conversions. Furthermore, the H-NACD 191 may convert the mobile node identifier from the packet data address to a circuit switched mobile node identifier. For instance, the H-NACD 191 may convert the mobile node identifier from an IP address to a 2G mobile node identifier.

The H-NACD 191 may also convert the current usage from data units to voice units. For example, the current usage unit in the 3G network 108 may comprise bytes transmitted and bytes received. The prepaid billing system 207 measures usage in terms of time. The H-NACD 191 may provide a conversion program or algorithm to convert the bytes transmitted and received into a time used. Such conversion program beneficially provides network providers with usage scalability and flexibility. For instance, one network provider may provide a calling plan that indicates that each byte is worth T(i) seconds. Another network provide may provide another calling plan that indicates that each byte is worth T(j) second for its own subscribers and T(k) for roaming users. As a result, the network providers may provide competitive pricing schemes, which allow for reduction in current usage units rate for volume discounting, preferred customer ratings, market influence, and other preference factors.

The H-NACD 191 may send to the prepaid billing system 207 the translated version of the account-update messages 420, or the second account-update messages 422. After receiving the second-account-update messages 422, the prepaid billing system 207 determines or recalculates the remaining or available prepaid services by debiting the current usage for the first and second of the concurrent-communication sessions from the prepaid services in the prepaid user account.

Responsively, the prepaid billing system 207 sends to the H-NACD 191 an account-update-acknowledgement message 424, which may contain the mobile node identifier and the updated prepaid services in the prepaid user account. The H-NACD 191 may relay account-update-acknowledgement message 424 to the PDSN 178. Alternatively, the H-NACD 191 may translate the account-update-acknowledgement message 424 to yield a second-account-update-acknowledgement message 426, which it may thereafter send to the PDSN 178.

In an exemplary embodiment, during connectivity of both the first and second of the concurrent-communication sessions, the prepaid billing system 207 may make periodic usage updates requests to PDSN 178. In response to these requests, the PDSN 178 may send to the prepaid billing system 207 the prepaid-services usages for the first and second of the concurrent-communication session. These periodic requests and responses may increase in frequency as the amount of remaining prepaid services in the user account diminishes.

When either the first of the concurrent-communication sessions or the second of the concurrent-communication session ceases, the prepaid billing system 207 receives from the PDSN 178, the prepaid-services usage for the first communication session and the second communication session that ceases.

The foregoing steps illustrate call flow 400 with an exemplary embodiment. The call flow 400, however, is not limited to these steps. Other embodiments with other steps can be used to practice call flow 400, as well.

Further, the foregoing description indicates carrying out call flow 400 for two communications sessions. The call flow 400, however, may be carried out for multiple, simultaneous communications sessions. Since each communication session is considered a separate communication session, call flow 400 may be carried out for each communication session in the identical or similar manner as described above, but call flow 400 may be carried out in other ways as well. The multiple, simultaneous communication sessions may (i) originate and terminate from the one or more wireless mobile nodes, (ii) connect through the one or more network-access devices, (iii) tunnel from one network-access device to other network-access devices, (iv) be handed-off (e.g., soft, fast, and/or hard hand-off) from one network-access device other access devices, and/or (v) be eligible to receive prepaid wireless services from the same user profile.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

Preferred and alternative embodiments of the present invention have been illustrated and described. It will be understood, however, that changes and modifications may be made to the invention without deviating from its true spirit and scope, as defined by the following claims.

What is claimed is:

1. A method for providing prepaid billing comprising:
   a first-network-access device receiving from a prepaid-user account prepaid services for a first-communication session;
   a second-network-access device requesting from the prepaid-user account prepaid services for a second-communication session in a data network while the first-communication session is ongoing;
   responsive to requesting prepaid services for a second-communication session, the first-network-access device receiving from a prepaid-billing system a request to update the prepaid-user account for prepaid-services usage of the first-communication session;
   responsive to the request, the first-network-access device sending to the prepaid-billing system prepaid services usage for the first communication session; and
   after the update of the prepaid-user account, the second-network-access device receiving from the prepaid-billing system prepaid services for the second communication session.

2. The method of claim 1, wherein the prepaid-billing system resides in a circuit-switched network.

3. The method of claim 2, wherein the first-network-access device and the second-network-access device are the same.

4. The method of claim 2, wherein the first-network-access device is selected from the group consisting of a authentication, authorization and accounting (AAA) device, and a foreign access control node.

5. The method of claim 1, wherein the second-network-access device is selected from the group consisting of a authentication, authorization and accounting (AAA) device, and a foreign access control node.

6. The method of claim 1, wherein the second-network-access device requests from the prepaid-user account prepaid services for a second-communication session by a mobile node identifier.

7. The method of claim 6, wherein the mobile-node identifier is selected from the group consisting of a Mobile Identification Number, a dialed phone number, a Mobile Directory Number, and a wireless mobile node's unique Electronic Serial Number.

8. The method of claim 1, wherein the first communication session comprises voice-session activity.

9. The method of claim 8, wherein the voice-session activity is circuit switched.

10. The method of claim 1, wherein the second communication session comprises non-voice/data-session activity.

11. The method of claim 10, wherein the non-voice/data-session activity is communicated as packet data.

12. The method of claim 1, wherein the data network comprises a packet data network.

13. The method of claim 1, wherein the data network is selected from the group consisting of a second-generation wireless network, a second-and-a-half-generation wireless network, a third-generation wireless network; a fourth-generation wireless network, an 802.11 wireless network, and a Bluetooth wireless network.

14. The method of claim 1, wherein the first-network-access device is an element in a circuit-switched network.

15. The method of claim 14, wherein the first-network-access device is selected from a group consisting of a signaling control point and a proxy server to a signaling control point.

16. The method of claim 1, wherein the prepaid-user-account resides in a data store in a circuit-switched network.

17. The method of claim 16, wherein the data store resides in a home location register.

18. A method for providing prepaid billing comprising:
    a prepaid-billing systems providing to a first-network-access device prepaid services withdrawn from a prepaid-user account for a first-communication session;
    the prepaid-billing system receiving from a second-network-access device in a data network a request for prepaid services for a second-communication session while the first-communication session is ongoing;
    responsive to requesting prepaid services for the second-communication session, the prepaid-billing system sending to the first-network-access device a request to update the prepaid-user account for prepaid-services usage of the first-communication session;
    the prepaid-billing system receiving from the first-network-access device prepaid services usage of the first communication session;
    the prepaid-billing system debiting the prepaid-services usage of first communication session from the prepaid-user account; and
    the prepaid-billing system sending to the second-network-access device prepaid services for the second communication session.

19. The method of claim 18, wherein the prepaid-billing system resides in a circuit switched network.

20. The method of claim 18, wherein the prepaid-billing system resides in a voice-prepaid system on a Signaling System 7 network.

21. The method of claim 19, wherein the first-access device and the second-network-access device are the same.

22. The method of claim 18, wherein the first-network-access device is selected from the group consisting of a authentication, authorization and accounting (AAA) device, and a foreign access control node.

23. The method of claim 18, wherein the second-network-access device is selected from the group consisting of a authentication, authorization and accounting (AAA) device, and a foreign access control node.

24. The method of claim 18, wherein the second-network-access device requests from the prepaid-user account prepaid services for a second-communication session by a mobile node identifier.

25. The method of claim 24, wherein the mobile-node identifier is selected from the group consisting of a Mobile Identification Number, a dialed phone number, a Mobile Directory Number, and a wireless mobile node's unique Electronic Serial Number.

26. The method of claim 18, wherein the first communication session comprises voice -session activity.

27. The method of claim 26, wherein the voice-session activity is circuit switched.

28. The method of claim 18, wherein the second communication session comprises non-voice/data-session activity.

29. The method of claim 28, wherein the non-voice/data-session activity is communicated as packet data.

30. The method of claim 18, wherein the data network comprises a packet data network.

31. The method of claim 18, wherein the data network is selected from the group consisting of a second-generation wireless network, a second-and-a-half-generation wireless network, a third-generation wireless network; a fourth-generation wireless network, an 802.11 wireless network, and a Bluetooth wireless network.

32. The method of claim 18, wherein the first-network-access device is an element in a circuit-switched network.

33. The method of claim 32, wherein the first-network-access device is selected from a group consisting of a signaling control point and a proxy server to a signaling control point.

34. The method of claim 18, wherein the prepaid-user-account resides in a data store in a circuit-switched network.

35. The method of claim 34, wherein the data store resides in a home location register.

36. The method of claim 18, further including:
the prepaid-billing system sending to the second-network-access device a second request to update the prepaid-user account for prepaid-services usage of the second-communication session; and
debiting the prepaid-services usage of the second communication session from the prepaid-user account.

37. The method of claim 18, wherein debiting the prepaid-services usage of the first communication session from the prepaid-user account produces remaining-prepaid services, and further comprising:
the prepaid-billing system sending to the first-network-access device a second request to update the prepaid-user account for prepaid-services usage of the first-communication session when the remaining-prepaid services reached a predetermined threshold.

38. A method for providing prepaid billing comprising:
a prepaid-billing systems providing to a first-network-access device prepaid services withdrawn from a prepaid-user account for a first-communication session;
the prepaid-billing system receiving from a second-network-access device in a data network a request for prepaid services for a second-communication session while the first-communication session is ongoing;
responsive to requesting prepaid services for the second-communication session, the prepaid-billing system sending to the first-network-access device a request to update the prepaid-user account for prepaid-services usage of the first-communication session;
the prepaid-billing system receiving from the first-network-access device prepaid services usage of the first communication session;
the prepaid-billing system debiting the prepaid-services usage of first communication session from the prepaid-user account;
the prepaid-billing system sending to the second-network-access device prepaid services for the second communication session;
the prepaid-billing system sending to the second-network-access device a second request to update the prepaid-user account for prepaid-services usage of the second-communication session; and
the prepaid-billing system debiting the prepaid-services usage of the second communication session from the prepaid-user account, wherein debiting the prepaid-services usage of the first communication session from the prepaid-user account and debiting the prepaid-services usage of the second communication produces remaining-prepaid services.

* * * * *